(12) United States Patent
Fujii

(10) Patent No.: US 7,593,553 B2
(45) Date of Patent: Sep. 22, 2009

(54) IMAGE CONNECTION METHOD, AND PROGRAM AND APPARATUS THEREFOR

(75) Inventor: Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 10/267,815

(22) Filed: Oct. 10, 2002

(65) Prior Publication Data

US 2003/0161510 A1    Aug. 28, 2003

(30) Foreign Application Priority Data

Feb. 25, 2002    (JP)    ............................ 2002-047492

(51) Int. Cl.
  *G06K 9/00*    (2006.01)
  *G06K 9/36*    (2006.01)
(52) U.S. Cl. ...................... 382/124; 382/284
(58) Field of Classification Search .............. 382/124, 382/284, 115
  See application file for complete search history.

(56) References Cited

U.S. PATENT DOCUMENTS

| | | | | |
|---|---|---|---|---|
| 4,537,484 A | * | 8/1985 | Fowler et al. | 396/15 |
| 4,635,293 A | * | 1/1987 | Watanabe | 382/130 |
| 4,784,484 A | * | 11/1988 | Jensen | 356/71 |
| 4,876,726 A | * | 10/1989 | Capello et al. | 382/124 |
| 5,917,960 A | * | 6/1999 | Sugawa | 382/278 |
| 6,289,114 B1 | * | 9/2001 | Mainguet | 382/124 |
| 6,529,613 B1 | * | 3/2003 | Astle | 382/103 |
| 6,728,404 B1 | * | 4/2004 | Ono et al. | 382/190 |
| 2002/0003892 A1 | * | 1/2002 | Iwanaga | 382/124 |
| 2002/0120195 A1 | * | 8/2002 | Hossack et al. | 600/443 |

FOREIGN PATENT DOCUMENTS

JP    2001-177714    6/2001

OTHER PUBLICATIONS

Japanese Patent Office Action, mailed Jan. 8, 2008 and issued in corresponding Japanese Patent Application No. 2002-047492.

* cited by examiner

*Primary Examiner*—Brian P Werner
*Assistant Examiner*—Kathleen S Yuan
(74) *Attorney, Agent, or Firm*—Staas & Halsey LLP

(57) ABSTRACT

Fingerprint section images of a finger are continuously input by relative movement with respect to a fingerprint sensor, and characteristic shapes such as ridge shapes, edge lines, and portions where changes of tangent directions are large are extracted from the fingerprint section images. Common areas in which character shapes match in two fingerprint section images which are chronologically continuous are searched by correlative calculation of characteristic shapes to detect an amount of movement of images at an overlapping position. Two living body section images which are chronologically continuous are connected to each other on the basis of the amount of movement to generate an entire living body image.

15 Claims, 32 Drawing Sheets

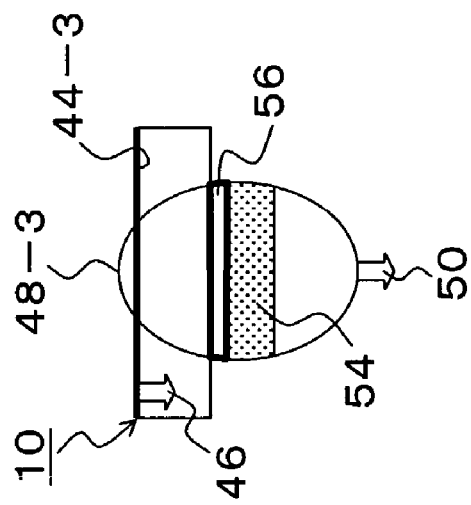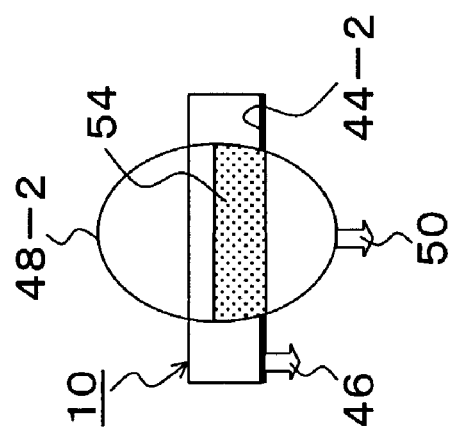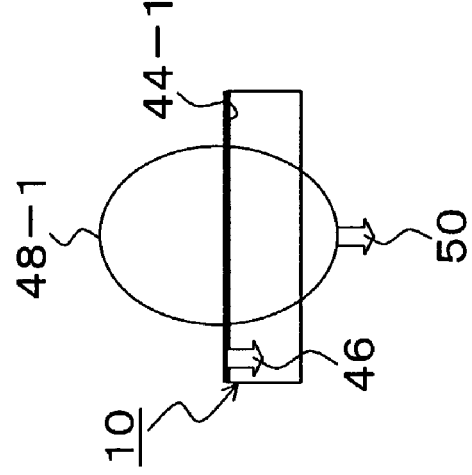

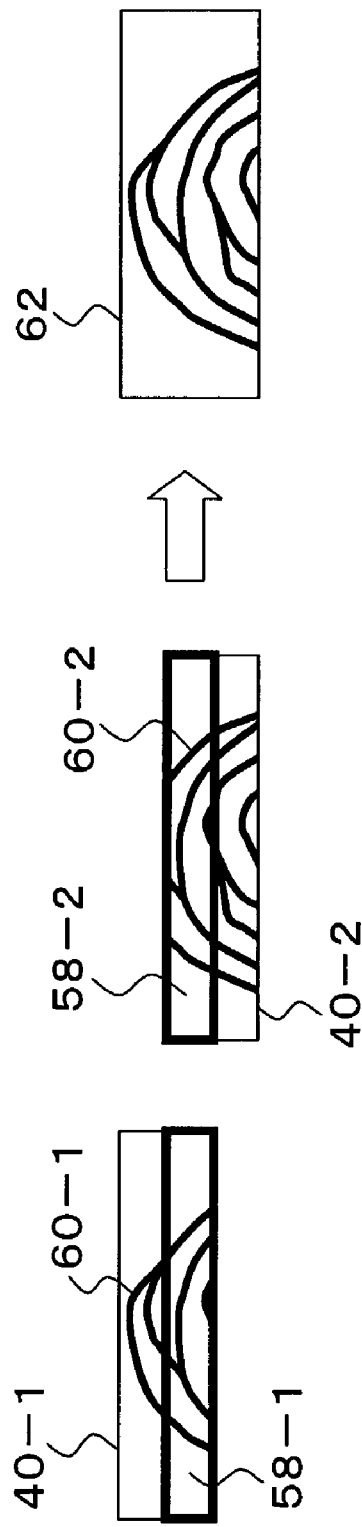

FIG. 13
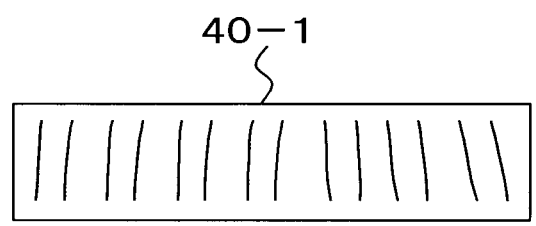
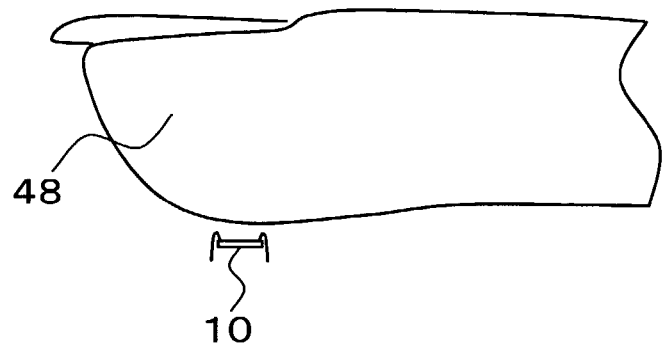
FIG. 14A
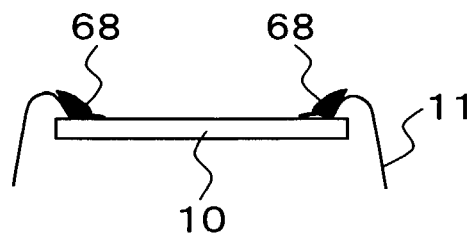
FIG. 14B

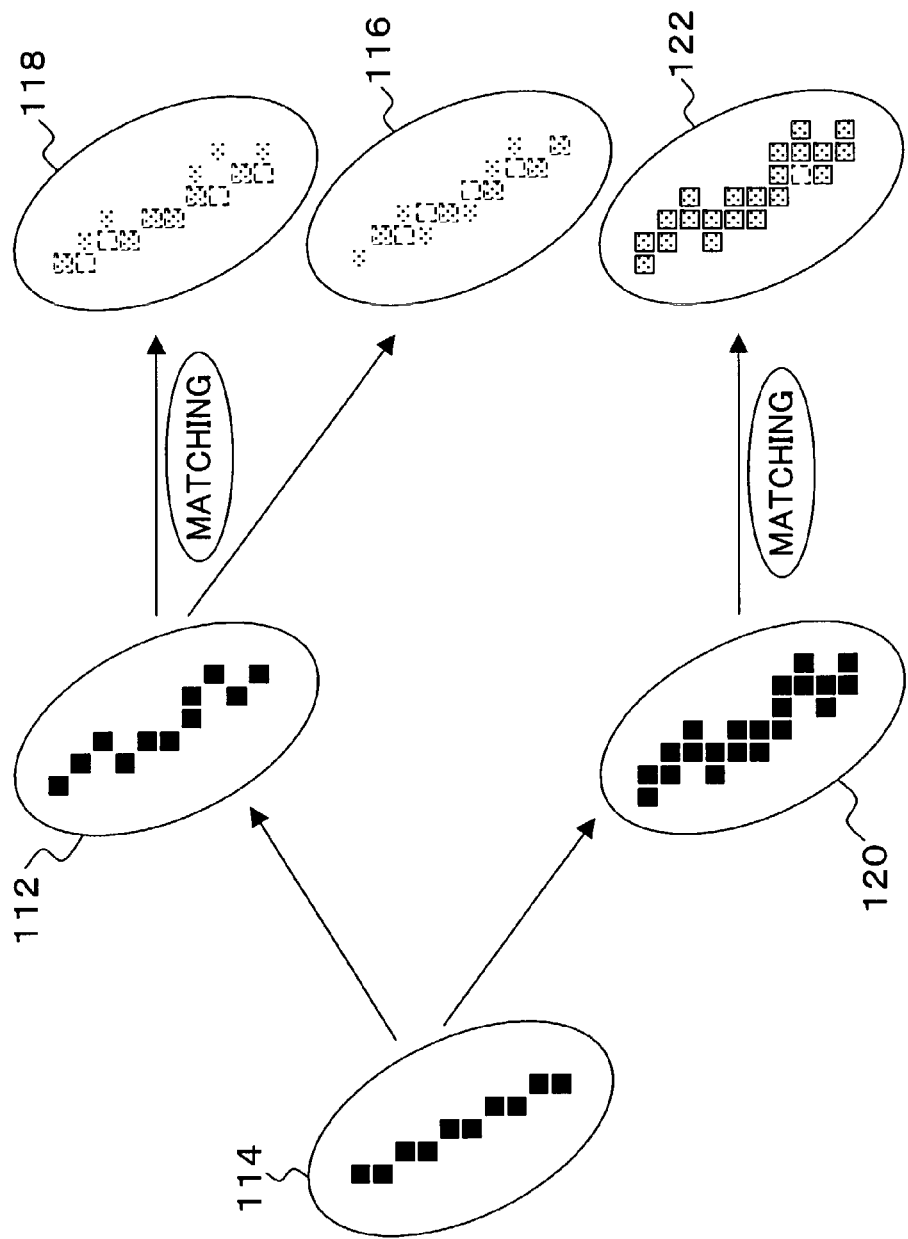

FIG. 37B
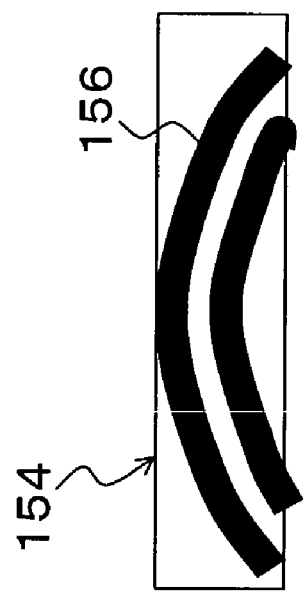
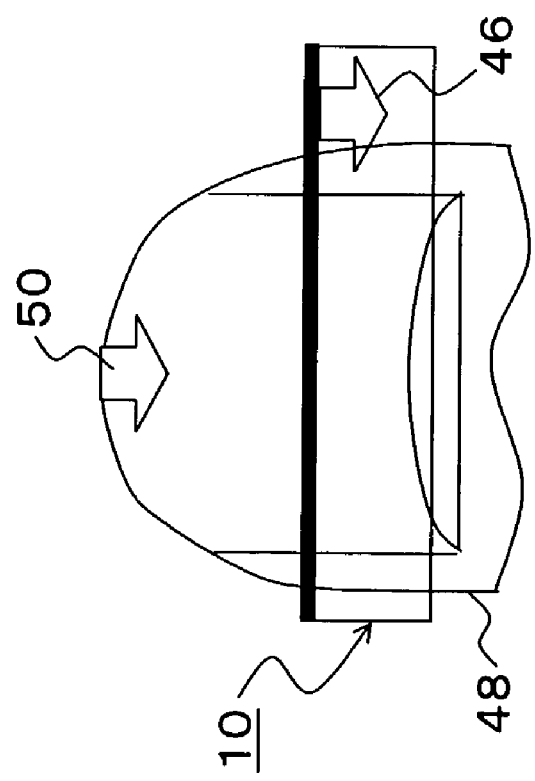
FIG. 37A

IMAGE CONNECTION METHOD, AND PROGRAM AND APPARATUS THEREFOR

BACKGROUND OF THE INVENTION

1. Field of the Invention

The present invention relates to an image connection method for connecting sectional fingerprint images which are continuously picked by a small sensor to each other to generate an entire image, and a program and an apparatus therefor and, more particularly, to an image connection method for extracting characteristic shapes from continuously picked sectional fingerprint images or the like to connect the characteristic shapes, and a program and an apparatus therefor.

2. Description of the Related Arts

In recent years, with achievement of multi-function and high-performance of portable phones and personal digital assistants (PDA) or the like, a lot of important information such as internal consumption information and personal information can be easily carried. For this reason, an electronic device such as a portable phone requires strong security. For example, a device which prevents recorded information from being seen by a person except for a holder of an electronic device is required. At the present, biometrics authentication which uses fingerprints, irises, voiceprints, signatures, and the like for reliably checking holders in place of IDs and passwords has attracted attentions. In the biometrics authentication, unique and individual characters habits are directly detected by a human body in advance and registered in a system. When authentication is to be performed, a unique and individual character or habit is detected and compared with a registered character or habit to identify the person. In the biometrics authentication, since a machine directly observes a human body, theft and falsification are difficult more than in authentication using passwords. Therefore, security higher than that in the authentication using passwords can be maintained.

However, in the biometrics authentication, security higher than that in ID or password authentication can be provided. However, a sensor for detecting a character of a human body is disadvantageously large. For example, in fingerprint authentication, a fingerprint sensor having a size almost equal to that of a fingertip is required. Portable phones and PDAs have been highly integrated and considerably miniaturized. For this reason, a sufficient space for mounting the fingerprint sensor is not left. Therefore, in order to cause a portable phone or a PDA to have a fingerprint recognition function, the fingerprint sensor must be more miniaturized.

For this reason, in order to apply an authentication technique while keeping the same usability as that in a conventional art, a method using a small sensor is proposed. As a conventional individual checking system using a fingerprint sensor, for example, a "fingerprint input apparatus" disclosed in Japanese Unexamined Patent Publication No. 8-263631 is known. In this conventional art, a rotatable cylindrical waveguide is used as a contact medium to a finger of a subject to make a contact portion of the finger of the subject movable, and an entire finger print is input by rotational scanning through an image pickup device. A rotational angle of the cylindrical waveguide at this time is detected by a rotational angle detection means. On the basis of the detected rotational angle, images are connected as a correct fingerprint image by image processing of an image processing means to reconstruct the fingerprint image. The rotational cylindrical waveguide is used as the contact medium to a finger to miniaturize optical components, so that considerable miniaturization is realized.

However, in such a conventional fingerprint input apparatus, a small sensor is used. However, the fingerprint input apparatus measures an amount of movement of a finger, and fingerprint images are connected to each other on the basis of the measurement result. For this reason, a mechanism for detecting an amount of movement of a finger except for a sensor for picking fingerprint images is required, and the miniaturization and cost reduction of the apparatus are not easily realized.

In addition, as another conventional art which does not require a detection mechanism except for a sensor for picking print images, an art disclosed in Japanese Patent No. 2971296 is known. In this conventional art, each line input from a one-dimensional sensor is compared with an image which has been input to extract an amount of character, and similar images are discriminated from each other to be used in checking. However, in a method of picking fingerprint images by using the one-dimensional sensor, when input conditions, i.e., a change in velocity of a finger, horizontal blurring, a difference between an amount of left movement and an amount of right movement, and a curve of a locus change, it is difficult to reconstruct fingerprint images to be input. As a result, checking data which is different from an original amount of character is generated, and a rate of rejecting identical persons at which the fingers of identical persons erroneously rejected increases. When a checking standard is moderated to increase a rate of accepting identical persons, a rate of accepting different persons at which different persons are erroneously recognized as identical persons disadvantageously increases. In addition, input images are compared with other images in units of lines, an amount of calculation increases, and a high-speed process cannot be realized.

SUMMARY OF THE INVENTION

According to the present invention, there is provided an image connection method which input images such as sectional fingerprints continuously picked by a small sensor for a compact device such as a portable phone at a high accuracy to generate an entire image, and a program and apparatus therefor.

The present invention provides an image connection method at least including:

the image input step of continuously inputting living body section images of a human body part by relative movement with respect to a read unit;

the character extraction step of extracting character shapes from the living body section images;

the common area searching step of searching common areas in which character shapes match in two living body section images which are chronologically continuous to detect relative amounts of movement of the images; and the image connection step of connecting two adjacent living body section images to each other on the basis of the relative amounts of movement of the images to generate a living body image larger than a sensing surface of a sensor. In this case, in the image connection method according to the present invention, the images of fingerprints, venous vascularnets, palm prints, palm shapes, face images, ear shapes, or irises are generated as the living body section images. In the image connection method according to the present invention, for example, when fingerprints are exemplified as living body sections, a finger is slid on a read unit functioning as a fingerprint sensor to pick a series of fingerprint section images which are chronologically continuous, image processing is performed to the picked fingerprint section images to emphatically use characteristic portions of ridge shapes, and common areas are extracted by correlative calculation to connect the images. For this reason, the section images can be connected to each other at a high accuracy resistantly to small distortion or noise of the ridges. Even fingerprint section images on which only striped ridges are reflected can be accurately connected to each other without horizontally shifting one ridge.

In the image input step, to a moving direction of a finger with respect to a predetermined human body part, e.g., the fingerprint read unit, a scanning direction of the read unit is oppositely set. When the moving direction of the finger and the scanning direction of the read unit are set to be opposite to each other, image reading ranges in the fingerprint section images are widened, and common areas for connection are sufficiently secured. In the character extraction step, as the character shapes of the living body section images, binary shapes of the living body section images are extracted. For example, when fingerprints are used, the ridge patterns of the fingerprints are extracted as binary shapes. In the character extraction step, as character shapes of the living body section images, edge lines which express contours in the binary shapes of the living body section images are extracted. For example, when fingerprints are used, as the ridge patterns of the fingerprints, edge lines serving as contours of the fingerprints are extracted from binary shapes. In addition, in the character extraction step, as the character shapes of the living body section images, portions in which amounts of changes of tangent directions of edge lines which express contours in the binary shapes of the living body section images are not less than a predetermined value are extracted. When the portions in which the changes are large in the tangent directions of the edge lines are detected as character shapes, fingerprint section images on which only striped ridges are reflected can be accurately connected to each other without horizontally shifting one ridge. In addition, in the character extraction step, as the character shapes of the living body section images, end points or branch points in the binary shapes of the living body section images are extracted. The extraction of the end points or the branch points is suitable for connection of the fingerprint section images on which only the striped ridges are reflected.

In the common area searching step, common areas are searched by correlative calculation of characteristic shapes in areas which overlap while relatively moving two adjacent living body section images to detect amounts of movement. More specifically, as the correlative calculation of the common area searching step, values of overlapping pixels in the areas which overlap while relatively moving the two adjacent living body section images, e.g., sums of products are calculated as evaluation values, and an amount of movement at a position where an evaluation value is maximum is detected. When fingerprint images are exemplified, as character shapes, ridge binary shapes, ridge edge lines, portions where changes of the tangent directions of the ridge edge lines are large, and end points and branch points of the ridges are known. When correlative calculation of the character shapes is performed, an evaluation value increases as the degree of matching of the character shapes increases, and images accurately overlap at a position where the evaluation value is maximum. For this reason, the amount of movement obtained at this time is detected for image connection. In the common area searching step, common areas are searched by correlative calculation of weights set depending on the degrees of the character shapes in the areas which overlap while relatively moving the two adjacent living body section images to detect an amount of movement. More specifically, as the correlative calculation in the common area searching step, sums of products of weights set for pixels which overlap in areas which overlap while relatively moving the two adjacent living body section images are calculated as evaluation values, and an amount of movement of a position where the evaluation value is maximum is detected. When fingerprint images are exemplified, and when portions where changes of the tangent directions of ridge edge lines are large are extracted as character shapes, weights of 0 and 1 are set for a background and a ridge edge line, and weights of 3 and 4 are set depending on a change of a tangent direction. When the correlative calculation is performed by using the weights, the evaluation value increases as the degree of matching of character shapes having great weights increases, and the maximum evaluation value can easily appear. Even though distortion and noise of the ridges exist, an amount of movement for connecting images to each other can be accurately detected.

In the common area searching step, after areas of the character shapes in the living body section images are extended, the correlative calculation is performed. For example, when the correlative calculation of edge lines of fingerprint section images on which only striped ridges are reflected is performed while shifting pixels, a difference between a correlative value obtained when images match and a correlative value obtained when images are shifted by one pixel, i.e., a change of the number of overlapping pixels is small, and a first candidate the evaluation value of which is maximum and the next second candidate have a small difference. For this reason, matching becomes inappropriate. Therefore, for example, pixel interpolation which horizontally extends pixels of edge lines of a connection destination, so that the number of overlapping pixels when the images match is increased for easy detection of the maximum evaluation value by the correlative calculation.

In the common area searching step, movement for performing the correlative calculation is limited in a predetermined moving range. In the limitation of the moving range in the correlative calculation, the movement is limited to a range which exceeds a statistically calculated interval, so that an error in which the images are connected to each other while shifting a fingerprint section image on which only striped ridges are reflected by one ridge can be avoided.

In the common area searching step, only an inside area spaced apart from an end of a living body section image by a predetermined distance or more is subjected to correlative calculation. For this reason, a finger is not in tight contact with the periphery of the window of a read unit functioning as a fingerprint sensor, and a fingerprint pattern cannot be accurately read because dust and water droplets are gathered between the read unit and a fixing frame therefor. Therefore, the portion is excluded from the subject of the correlative calculation to improve the accuracy of matching.

In the image connection method according to the present invention, in the character extraction step, edge lines which express the binary shapes of the living body section images or contours in the binary shapes are extracted as character shapes of the living body section images, and, in the common area searching step, overlapping connection points where changes of tangent directions of lines or edge lines of the binary shapes in two living body section images which are chronologically continuous are smooth and continued are searched to detect amounts of movement. This image connection is a process performed when matching is not appropriately performed according to the character shapes of fingerprint ridges. As necessary and sufficient conditions, "connection points match, and a change of the tangent direction at the connection point is smooth" is set, and an amount of movement at a position where the images which satisfy the necessary and sufficient condition overlap.

In the image connection step, a ratio of expansion or contraction of an image obtained when a relative speed is generated between a scanning line of a scanner and an object to be observed is calculated from a moving velocity of a human body part with respect to the read unit and a scanning speed of the read unit to correct living body section images to be connected. In reading a fingerprint image in the present invention, both the scanning line of the read unit and a finger move, the image expands and contracts by Doppler effect generated by the relationship between the relative speeds of both the scanning line and the finger. Therefore, the ratio of expansion or contraction caused by Doppler effect is calculated to correct fingerprint section images, and the fingerprint section images are connected to each other, so that a more accurate fingerprint image can be obtained.

The image connection method according to the present invention further includes the step of deciding the start of reading or the end of reading of the living body section images from amounts of movements detected in the common area searching step. For this reason, another sensor for detecting the start and end of reading is not required.

In an image connection method according to another aspect of the present invention, read living body section images are horizontally divided, and a process for connection is performed for the respective divided areas. This image connection method at least includes:

the image input step of continuously inputting living body section images of a human body part by relative movement with respect to a read unit;

the image dividing step of dividing the input images into a plurality of areas;

the character extraction step of extracting character shapes from the living body section images in each divided area;

the common area searching step of searching common areas in which character shapes in two adjacent living body section images match in each divided area to detect amounts of movement; and the image connection step of connecting two adjacent living body section images to each other on the basis of the relative amounts of movement in each divided area to generate an entire living body image. In the process in which images are horizontally divided and the divided images are connected to each other, for example, when fingerprint images are used, and a finger is slid on the read unit, some ridges preferably match due to horizontal expansion and contraction of the skin of the finger, but other ridges may not match. Therefore, when a fingerprint section image is divided into, e.g., left and right areas to perform the process, the degree of matching between ridges in the left and right divided areas becomes high, and matching performance is improved. An amount of extension of the image is detected and corrected depending on the distance between the divided areas after the matching, so that an accurate entire image can be obtained.

Still another aspect of the present invention provides a method of detecting an amount of movement of a measuring object by using image reading of a human body part. This moving amount detection method at least includes:

the image input step of continuously inputting living body section images of a human body part by relative movement with respect to a read unit;

the character extraction step of extracting character shapes from the living body section images; and the common area searching step of searching common areas in which character shapes match in two living body section images which are chronologically continuous to detect relative amounts of movement of the images. The method of detecting an amount of movement can be used in a cursor point which moves a cursor on a screen depending on movement of a finger.

Still another aspect of the present invention provides a moving direction decision method using image reading of a human body part. This moving direction decision method at least includes:

the image input step of continuously inputting living body section images of a human body part by relative movement with respect to a read unit; and the detection step of detecting a moving direction of the human body part on the basis of expansion and contraction of images caused by Doppler effect of the living body section images. In this case, the detection step decides that the moving direction of the human body part is opposite to the scanning direction of the read unit on the basis of the contraction of the human body section image, and that the moving direction of the human body part is equal to the scanning direction of the read unit on the basis of the expansion of the section image. In this manner, the moving direction of the finger can be easily detected on the basis of the expansion and contraction of a read image caused by Doppler effect. For this reason, for example, the read unit functioning as a fingerprint sensor can be used as a touch pad.

The present invention provides a program for image connection. This program causes a computer to execute:

the image input step of continuously inputting living body section images of a human body part by relative movement with respect to a read unit;

the character extraction step of extracting character shapes from the living body section images;

the common area searching step of searching common areas in which character shapes match in two living body section images which are chronologically continuous to detect relative amounts of movement of the images.

the image connection step of connecting two adjacent living body section images to each other on the basis of the relative amounts of movement of the images to generate a living body image which is larger and wider than a sensing surface of a sensor.

The present invention provides a program for detecting an amount of movement of a human body part. This program causes a computer to execute:

the image input step of continuously inputting living body section images of a human body part by relative movement with respect to a read unit;

the character extraction step of extracting character shapes from the living body section images; and the common area searching step of searching common areas in which character shapes match in two living body section images which are chronologically continuous to detect relative amounts of movement of the images.

The present invention provides a program for detecting a moving direction of a human body part. This program causes a computer to executes:

the image input step of continuously inputting living body section images of a human body part by relative movement with respect to a read unit; and the detection step of detecting a moving direction of the human body part on the basis of expansion and contraction of images caused by Doppler effect of the living body section images.

The present invention provides an image connection apparatus. This image connection apparatus at least includes: an image input unit for continuously inputting living body section images of a human body part by relative movement with respect to a read unit; a character extraction unit for extracting character shapes from the living body section images; a common area searching unit for searching common areas in which character shapes match in two living body section images which are chronologically continuous to detect relative amounts of movement of the images; and an image connection unit for connecting two adjacent living body section images to each other on the basis of the relative amounts of movement to generate a living body section image larger than a sensing surface of a sensor.

The present invention provides a moving amount detection apparatus. The moving amount detection apparatus at least includes: an image input unit for continuously inputting living body section images of a human body part by relative movement with respect to a read unit; a character extraction unit for extracting character shapes from the living body section images; and a common area searching unit for searching common areas in which character shapes match in two living body section images which are chronologically continuous to detect relative amounts of movement of the images.

The present invention provide a moving direction decision apparatus. The moving direction decision apparatus at least includes: an image input unit for continuously inputting living body section images of a human body part by relative movement with respect to a read unit; and a detection unit for detecting a moving direction of the human body part on the basis of expansion and contraction of images caused by Doppler effect of the living body section images.

The above and other objects, features, and advantages of the present invention will become more apparent from the following detailed description with reference to the drawings.

BRIEF DESCRIPTION OF THE DRAWINGS

FIGS. 6A to 6C are diagrams for explaining a reading range obtained when the scanning direction of the read unit and the moving direction of the finger are set to be equal to each other;

FIG. 11 is a diagram for explaining common areas and image connection of fingerprint section images which are chronologically continuous;

FIG. 13 is a diagram for explaining a fingerprint section image of only a striped fingerprint edge line serving as a factor which limits the moving range in FIG. 12;

FIGS. 14A and 14B are diagrams for explaining read scanning in which a finger is brought into contact with a read unit and slid on the read unit and a stain state of a read window;

FIG. 16 is a diagram for explaining an extended process which performed as a pre-process of edge line correlative calculation;

FIGS. 37A and 37B are diagrams for explaining expansion of an image by Doppler effect when a read/scanning direction and a moving direction of a finger are equal to each other.

DETAILED DESCRIPTION OF THE PREFERRED EMBODIMENT

Figure 1:
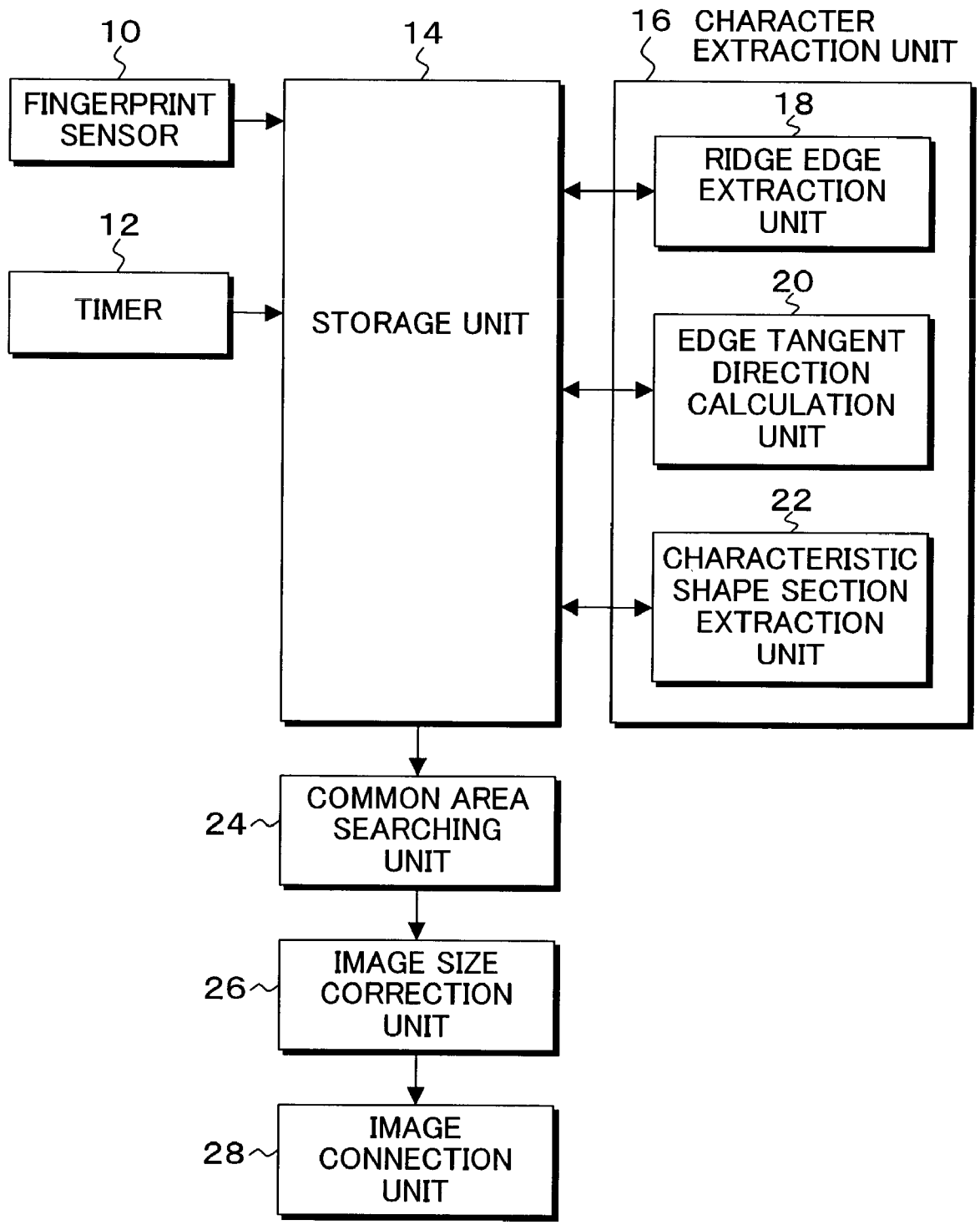
FIG. 1 is a block diagram of a function configuration of an image connection apparatus according to the present invention.

FIG. 1 is a block diagram of a function configuration of an image connection apparatus according to the present invention. The image connection apparatus according to the present invention is constituted by a fingerprint sensor 10, a timer 12, a storage unit 14, a character extraction unit 16, a common area searching unit 24, an image size correction unit 26, and an image connection unit 28. The character extraction unit 16 comprises a ridge edge extraction unit 18, an edge tangent direction calculation unit 20, and a characteristic shape section extraction unit 22. The fingerprint sensor 10 functions as an image read unit. A finger is pressed on a sensor read surface and slid on the sensor read surface, so that fingerprint section images are continuously read to be stored in the storage unit 14. The timer 12 outputs time information. Pieces of photographing time information are connected to the fingerprint section images continuously read by the fingerprint sensor 10, and are stored in the storage unit 14. The character extraction unit 16 performs image processing to a plurality of fingerprint section images which are stored in the storage unit 14 and which are chronologically continuous to extract characteristic shapes of fingerprint ridges. In the present invention, the following characters in the fingerprint ridges are extracted.

(1) Edge line serving as contour of fingerprint ridge (2) Portion where change of tangent direction in ridge edge line is sharp (3) End point and branch point on ridge edge line In accordance with the three types of character extraction, in the character extraction unit 16, the ridge edge extraction unit 18, the edge tangent direction calculation unit 20, and the characteristic shape section extraction unit 22 are arranged. The common area searching unit 24 performs correlative calculation to extracted character shapes of two fingerprint section images which are stored in the storage unit 14 and which are chronologically continuous while relatively shifting positions to calculate evaluation values, detects an overlapping position where the maximum evaluation value is obtained as a connection position, and detects a positional relationship between the two fingerprint section images, i.e., an amount of movement in a two-dimensional plane on the basis of the connection position. The image size correction unit 26 corrects expansion and contraction of a fingerprint section image caused by Doppler effect when image reading is performed by the fingerprint sensor 10. The image connection unit 28 connects the two fingerprint section images which are chronologically continuous according to the amount of movement detected by the common area searching unit 24. The image size correction unit 26 and the image connection unit 28 may be arranged in inverse order. In this case, in connection, correspondence between a specific position, i.e., a specific fingerprint section image and a specific amount of correction (Doppler coefficient) is stored.

Figure 2:
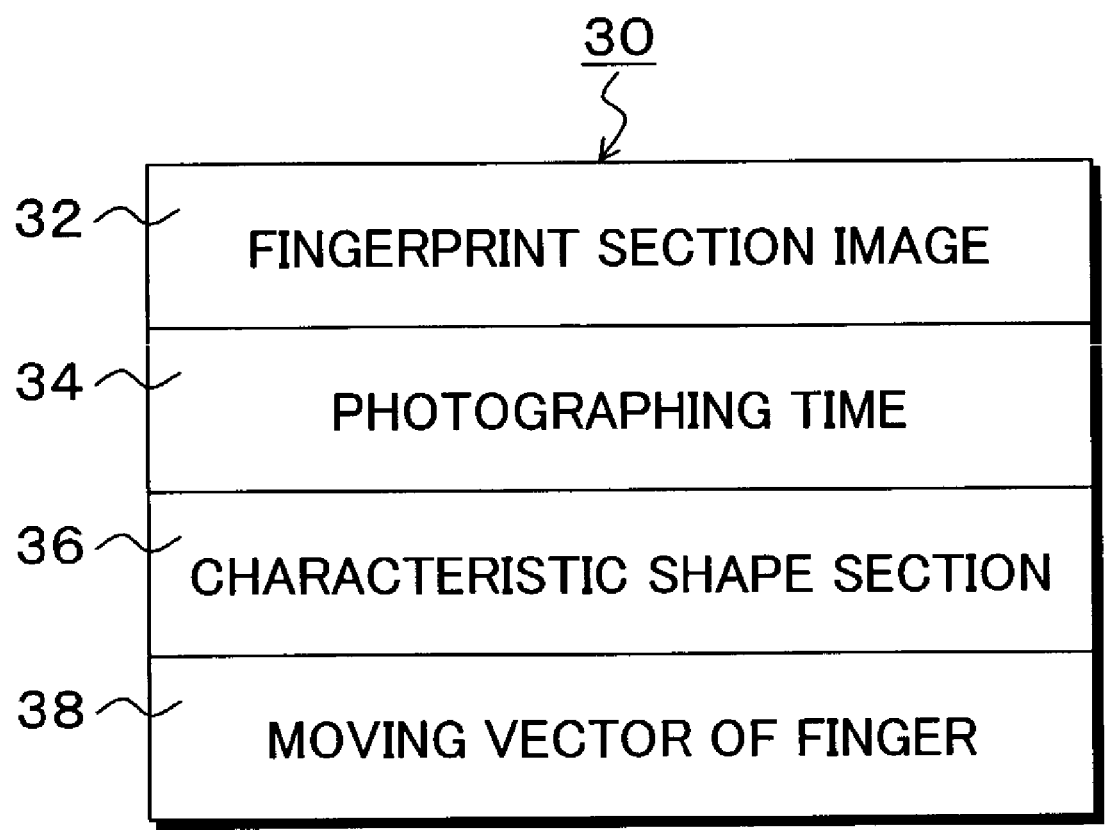
FIG. 2 is a diagram for explaining a data structure stored in a storage unit in FIG. 1.

FIG. 2 shows a data structure 30 of each fingerprint section image stored in the storage unit 14 in FIG. 1. In the data structure 30, a fingerprint section image 32 read by the fingerprint sensor 10, a photographing time 34 obtained from the timer 12, a ridge edge line extracted by the character extraction unit 16, a portion where a change of a tangent direction of the ridge edge line is large, a characteristic shape section 36 such as an end point or a branch point of an ridge edge line, and a moving vector 38 of a finger which indicates an amount of movement detected by the common area searching unit 24 are stored.

Figure 3:
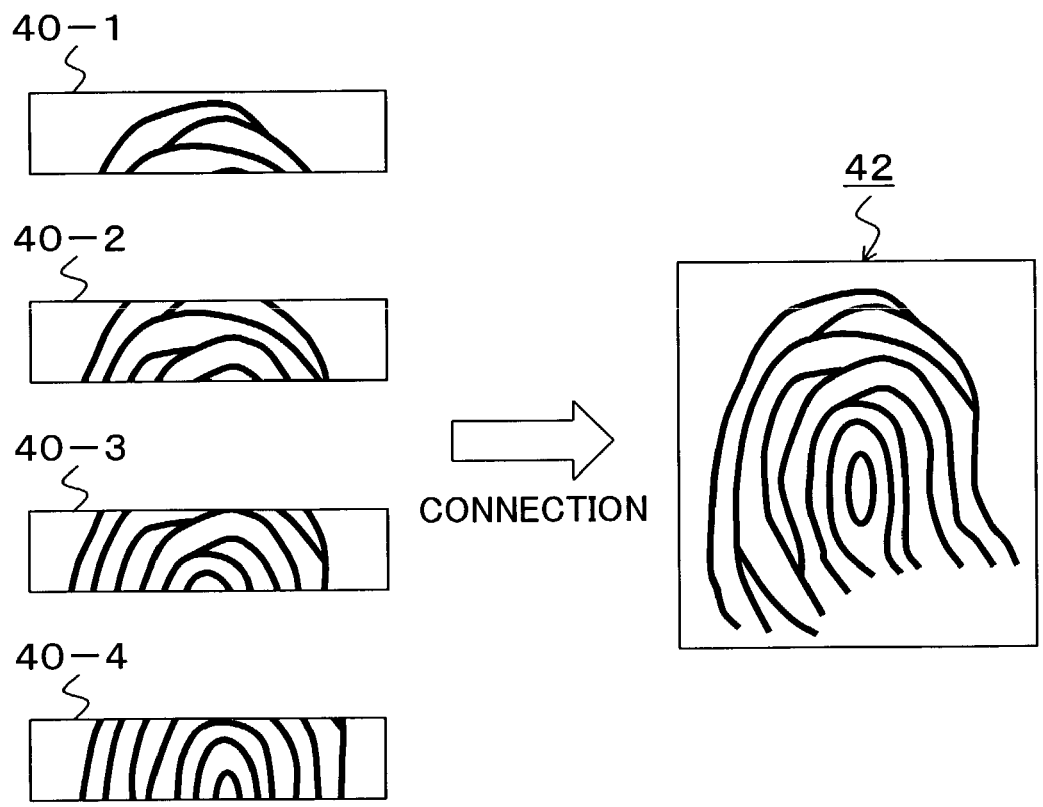
FIG. 3 is a diagram for explaining a connection process of fingerprint section images according to the present invention.

FIG. 3 shows an example of fingerprint section images 40-1, 40-2, 40-3, 40-4, . . . received by the image connection apparatus in FIG. 1 and an fingerprint section image 42 which is obtained by connecting these fingerprint section images to each other or which is larger than a sensing surface. As the fingerprint sensor 10, a two-dimensional sensor which can be applied to a compact device such as a portable phone is used. As the fingerprint sensor 10, a two-dimensional sensor which can be applied to a compact device such as a portable phone is used. As the fingerprint sensor 10, in this embodiment, a fingerprint sensor which has a resolution of 500 dpi and which has a dot size (256×32) in which 256 dots are arranged in a horizontal direction, e.g., a main scanning direction and 32 dots are arranged in a sub-scanning direction, i.e., a relative moving direction of a finger is used. The dimensions of the fingerprint sensor 10 which uses a two-dimensional image sensor having such the dot size are small, i.e., a horizontal dimension is about 12.5 mm, and a vertical dimension is about 1.5 mm. The fingerprint sensor 10 can be sufficiently applied as a read unit of a compact device such as a portable phone. When a finger is brought into contact with the fingerprint sensor 10 and slid, fingerprint section images 40-1, 40-2, 40-3, 40-4, . . . , as shown in FIG. 3, are chronologically and continuously loaded, and can be stored in the storage unit 14. In this case, a moving velocity of the finger brought into contact with the fingerprint sensor 10 and slid is a maximum of about 8 cm/sec, and a read sampling frequency in the fingerprint sensor 10 is set to be, e.g., 100 Hz. When the fingerprint sensor 10 is driven at the read sampling frequency as described above to continuously load the fingerprint section images 40-1, 40-2, 40-3, 40-4, . . . , as shown in FIG. 3, two fingerprint section images which are chronologically continuous, for example, adjacent image sections of the fingerprint section image 40-1 and the fingerprint section image 40-2 serve as overlapping common image areas. Therefore, in the present invention, with respect to two fingerprint section images which are chronologically continuous, dot patterns which are basic binary information of fingerprint ridges are used as character shapes, and evaluation values are calculated by correlative calculation of pixels while shifting the positions of the two fingerprint section images. A position where the maximum evaluation value is obtained is detected as a position where the common areas overlap, and amounts of movement of the images with respect to this position are detected.

Figure 4:
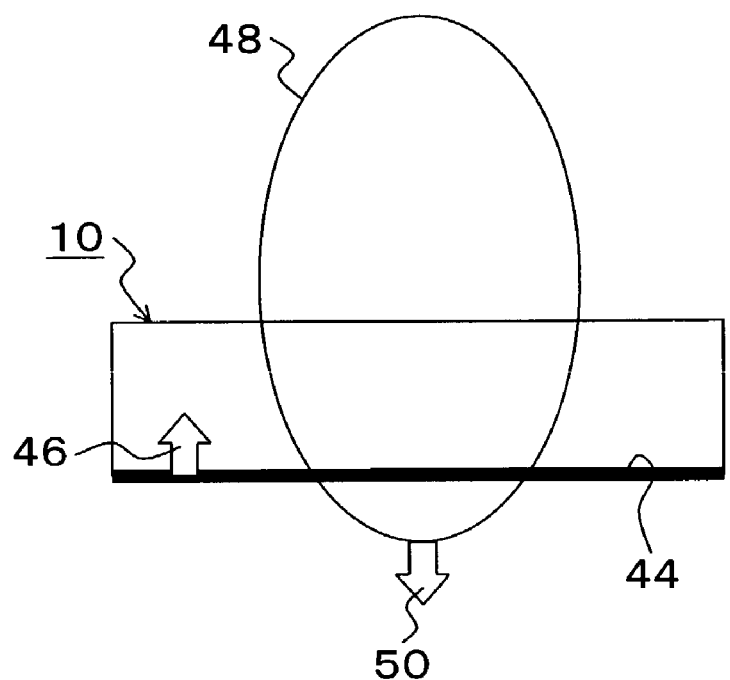
FIG. 4 is a diagram for explaining a scanning direction of a read unit and a moving direction of a finger.

A relationship between a scanning direction of the fingerprint sensor 10 in FIG. 1 and a moving direction of a finger will be described below. FIG. 4 shows a position of a finger 48 with respect to an initial position of a scanning line 44 of the fingerprint sensor 10. In this example, the scanning line 44 of the fingerprint sensor 10 is scanned from the initial position shown in FIG. 4 in a scanning direction 46 indicated by an arrow. In the present invention, the finger 48 is moved in a moving direction 50 which is opposite to the scanning direction 46 of the scanning line 44.

Figure 5A:
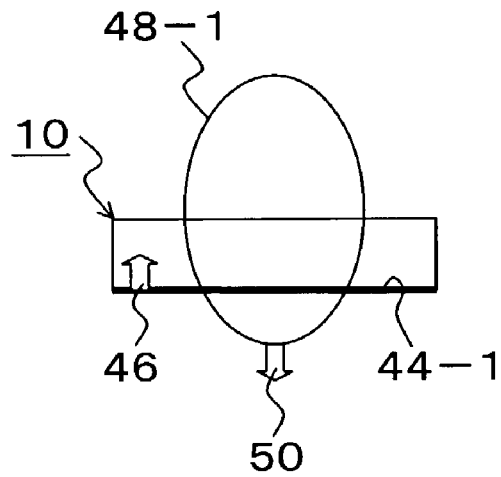
FIGS. 5A and 5B are diagrams for explaining a reading range obtained when the scanning direction of the read unit and the moving direction of the finger are set to be opposite to each other.
Figure 5B:
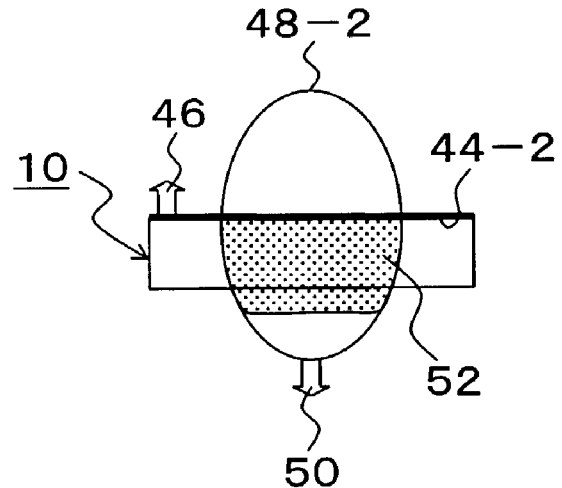

FIGS. 5A and 5B show an image loading operation performed when the scanning direction 46 of the fingerprint sensor 10 is opposite to the moving direction of the finger 48 as shown in FIG. 4. FIG. 5A shows a read start state. It is assumed that a scanning line 44-1 of the fingerprint sensor 10 is at an initial position and that a finger 48-1 is at an illustrated position at this time. In this state, it is assumed that the scanning line 44-1 scans a fingerprint in the scanning direction 46 while moving the finger 48-1 in the moving direction 50 and that a scanning line 44-2 moves to a scanning end position in FIG. 5B. An image loading range 52 obtained from the scanning line 44-1 at the start position of the fingerprint sensor 10 to the scanning line 44-2 at the end position on the finger 48-2 is a loading range which is larger than the width of the moving direction of the fingerprint sensor 10 when the moving direction 50 is opposite to the scanning direction 46.

FIGS. 6A to 6C show an image loading operation performed when the scanning direction 46 of the fingerprint sensor 10 is opposite to the moving direction 50 of a finger. FIG. 6A shows a read start state. The scanning line 44-1 of the fingerprint sensor 10 is at an initial state, and scans a fingerprint in the scanning direction 46. In contrast to this, the finger 48-1 is also moved in the same direction, i.e., the moving direction 50. FIG. 6B shows a scanning end state of the fingerprint sensor 10. The scanning line 44-2 moves to the scanning end position, and, at the same time, the finger 48-2 also moves in the moving direction 50. In this manner, when the scanning direction 46 of the fingerprint sensor 10 is equal to the moving direction 50 of the finger, a reading range of the finger moving from the scanning line 44-1 at the start position to the scanning line 44-2 at the end position is narrower than the width of the fingerprint sensor 10 in the scanning direction like an image loading range 54.

According to the relationships in FIGS. 5A and 5B and FIGS. 6A to 6C, in the present invention, the moving direction 50 of the finger is set to be opposite to the scanning direction 46 of the fingerprint sensor 10 as shown in FIGS. 5A and 5B, so that the loading range of section images of the finger can be enlarged. In addition, when the moving direction 50 of the finger is equal to the scanning direction 46 of the fingerprint sensor 10 in FIGS. 6A to 6C if it takes a certain period of time to return a scanning sensor 44-3 to the next read start position in FIG. 6C, the finger moves like a finger 48-3 without performing a read operation in this period of time. Therefore, an unreadable area 56 is generates subsequent to the image loading range 54. For this reason, the moving direction 50 of the finger is set to be opposite to the scanning direction 46 of the fingerprint sensor 10 in the present invention.

Figure 7:
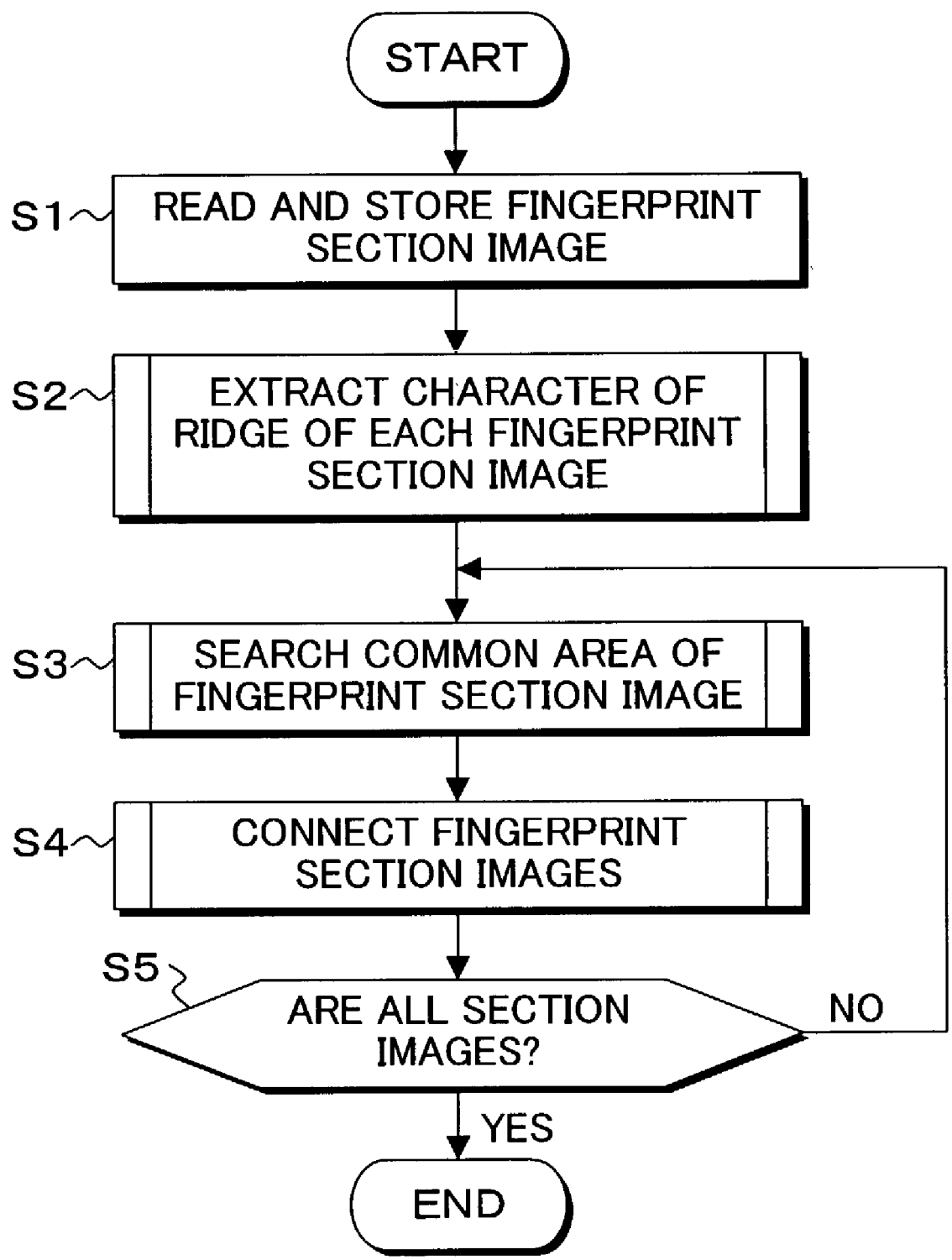
FIG. 7 is a flow chart of a basic procedure of an image connection method according to the present invention.

FIG. 7 is a flow chart of a basic procedure in the image connection apparatus in FIG. 1. A finger is brought into contact with the fingerprint sensor 10 and moved in step S1, so that fingerprint section images which are chronologically continuous as shown in FIG. 3 are read and stored. In this case, in the image read apparatus in FIG. 1, since the fingerprint section images are continuously loaded by the fingerprint sensor 10, the start of image reading and the end of image reading of the fingerprint sensor 10 must be correctly detected. In the detection of the start and end of image reading, a dedicated sensor such as a touch sensor is required in a conventional device. However, in the present invention, since an amount of movement of a finger can be detected by the common area searching unit 24, the start and end of reading and scanning in the fingerprint sensor 10 can be easily decided on the basis of a detection result of the amount of movement of the finger. The detection of the amount of movement based on the correlative calculation in the common area searching unit 24 will be made apparent in the following description. Upon completion of reading and scanning fingerprint section images in step S1, the characters of the ridges of the fingerprint section images are extracted in step S2. As the character extracted from the ridge, a dot pattern obtained by binarizing the ridge, an edge pattern obtained by extracting a contour of the dot pattern, a portion where a change is sharp from calculation of a tangent direction at each point of an edge pattern, and an end point or a branch point of the ridge in the edge pattern are known. In step S3, common areas in which two fingerprint section images which are chronologically continuous overlap are searched to detect an amount of movement. Subsequently, in step S4, on the basis of the amount of movement detected by the common area searching, the two fingerprint section images which are chronologically continuous are overlapped and connected to each other. In step S5, the presence/absence of connections between all the fingerprint section images is checked. When all the connections are not ended, the control flow returns to step S3, and a connection process based on common area searching between the fingerprint section images and loaded fingerprint section images is repeated. When the processing capability of the CPU is high, the control flow may return from step S5 to step S1. Upon completion of connections between all the section images, a series of processes are ended.

Figure 8:
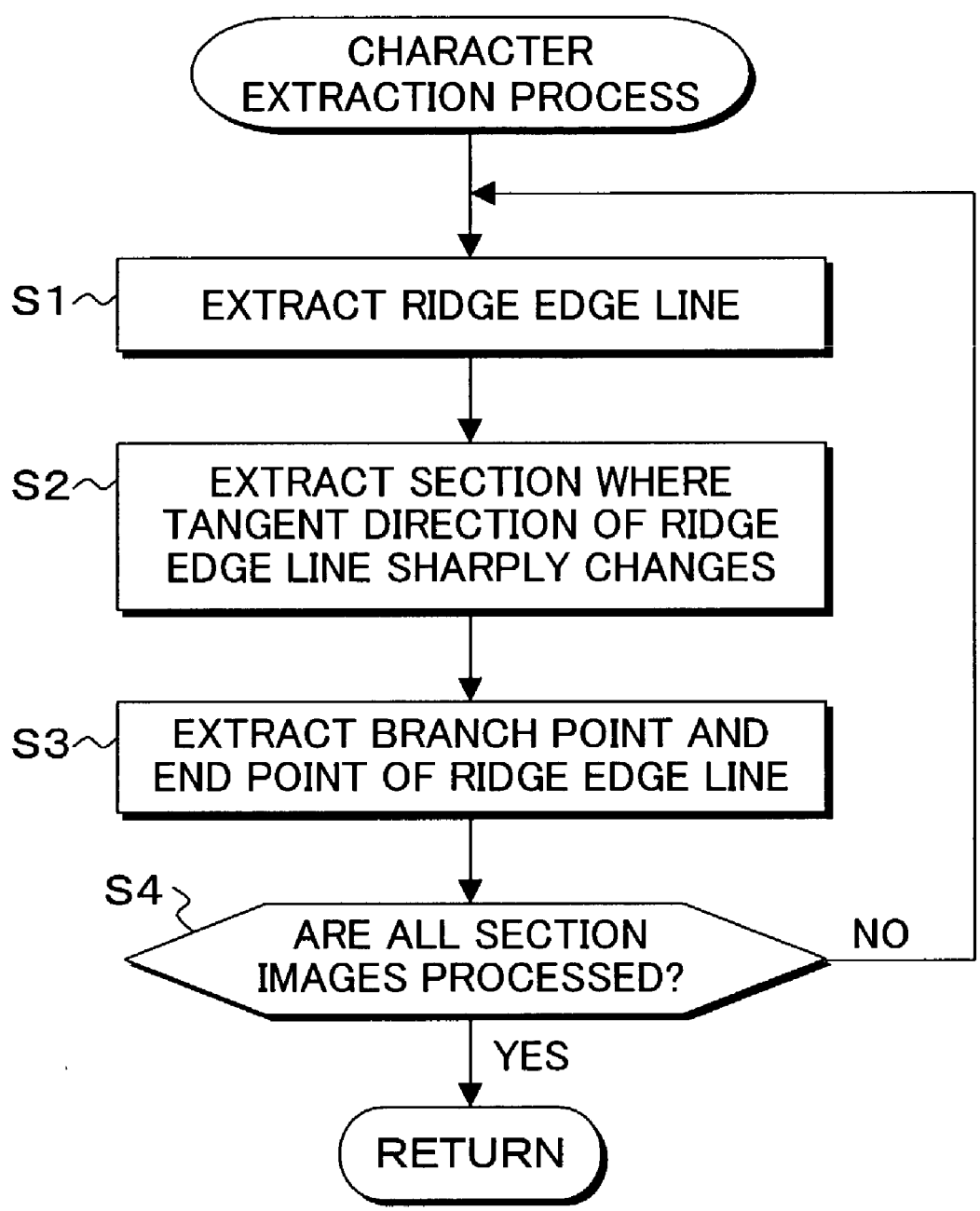
FIG. 8 is a detailed flow chart of a character extraction process in FIG. 7.

FIG. 8 is a detailed flow chart of character extraction of a fingerprint ridge in step S2 in FIG. 7. In the character extraction process to the fingerprint ridge, contours of a ridge dot pattern generated as a binary image in step S1 are obtained by image processing, and ridge edge lines are extracted. Edge lines may be extracted by using a Laplacian filter without binary images. Sequentially, tangent directions at positions of the ridge edge lines are calculated in step S2, and portions where changes of tangent directions are sharp, i.e., portions where changes of tangent directions exceed a predetermined value are extracted as characteristic portions. In step S3, from the portions where the changes of the tangent directions in the ridge edge lines are sharp, end points and branch points of the ridges are extracted as characteristic shapes. The extraction process of the characteristic shapes in steps S1 to S3 are repeated until all the fingerprint section images are processed in step S4.

Figure 9A:
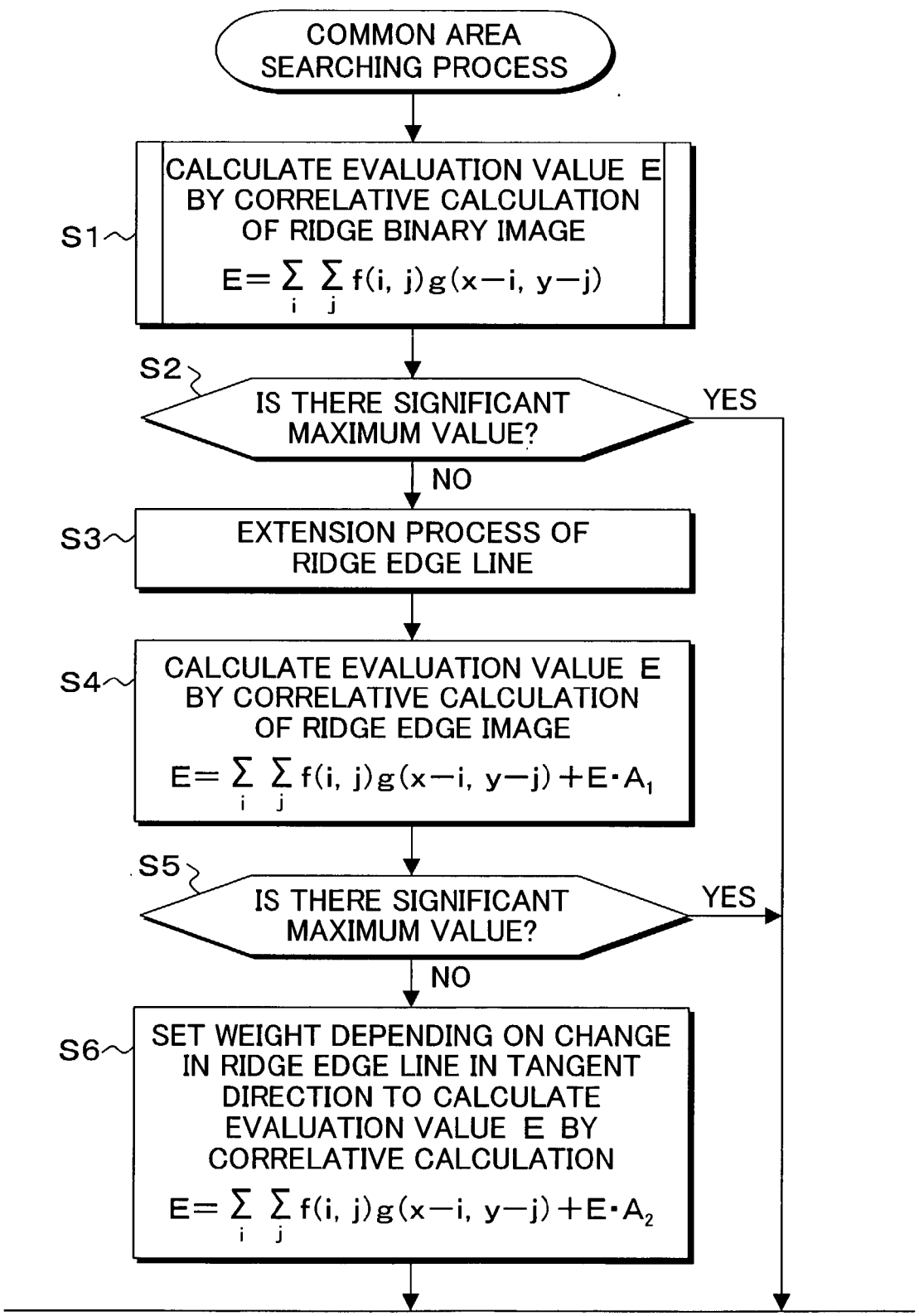
FIGS. 9A and 9B are detailed flow charts of a common are searching process in FIG. 7.
Figure 9B:
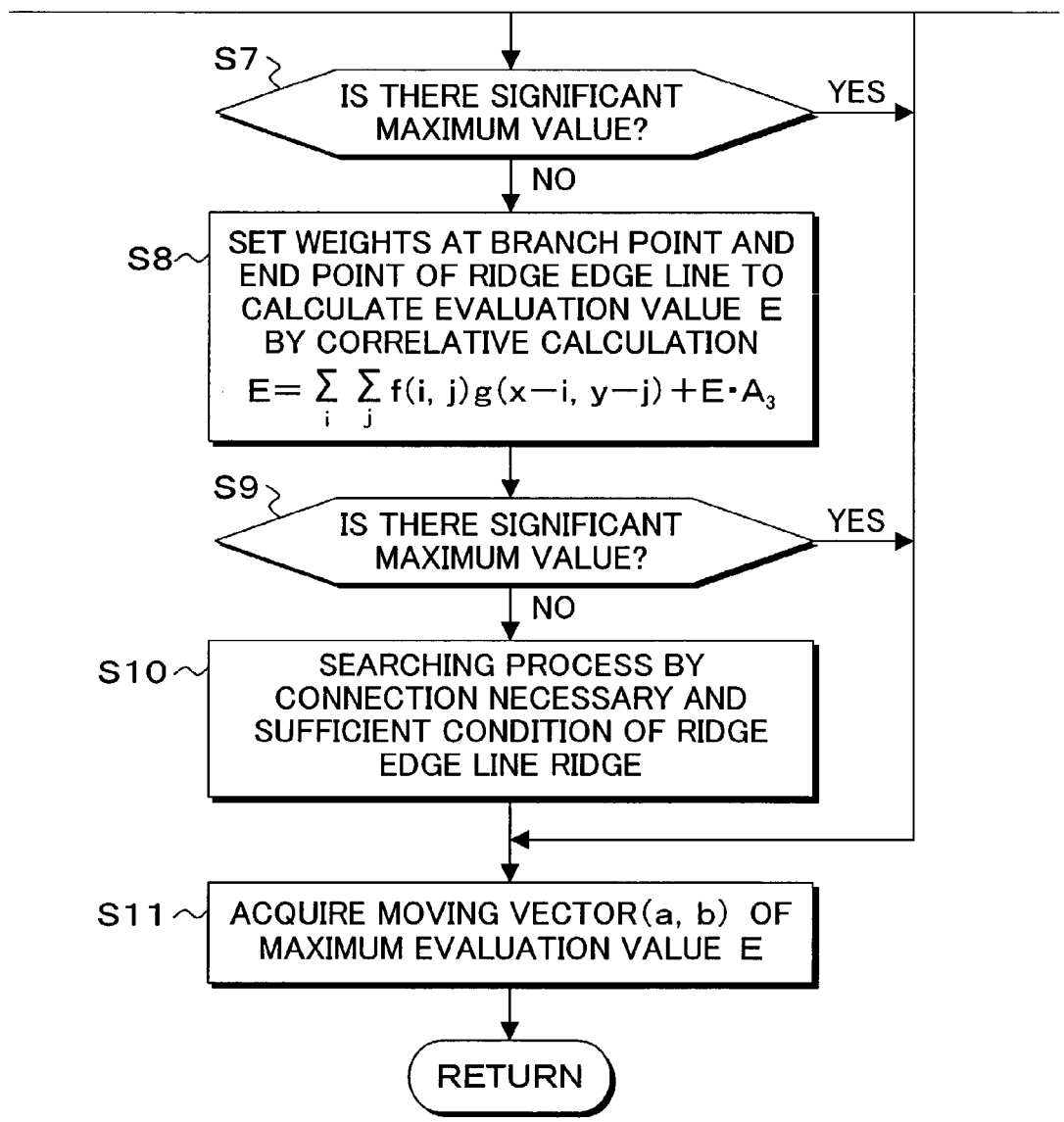

FIGS. 9A and 9B show a detailed flow chart of the common area searching process in step S3 in FIG. 7. The common area searching process is performed in the order of characteristic portions extracted by the character extraction process in FIG. 8.

(1) Common area searching process using dot pattern serving as ridge binary image (S1 and S2).

(2) Common area searching process using edge line pattern (S3 to S5).

(3) Common area searching process using change of tangent direction of ridge edge line (S6 and S7).

(4) Common area searching process using end point and branch point of ridge edge line (S8 and S9).

(5) Searching process by necessary and sufficient condition for connection when searching is impossible by using extracted characteristic portions (S10).

When the maximum value of evaluation values calculated by correlative calculation in any one of the common area searching processes is obtained as a significant value, it is determined that the searching is succeeded, a moving vector which gives the maximum evaluation value in step S11, i.e., a moving vector (a, b) which is required to overlap common areas of two fingerprint section images is acquired, and the control flow returns to the main routine in FIG. 7.

Figure 10:
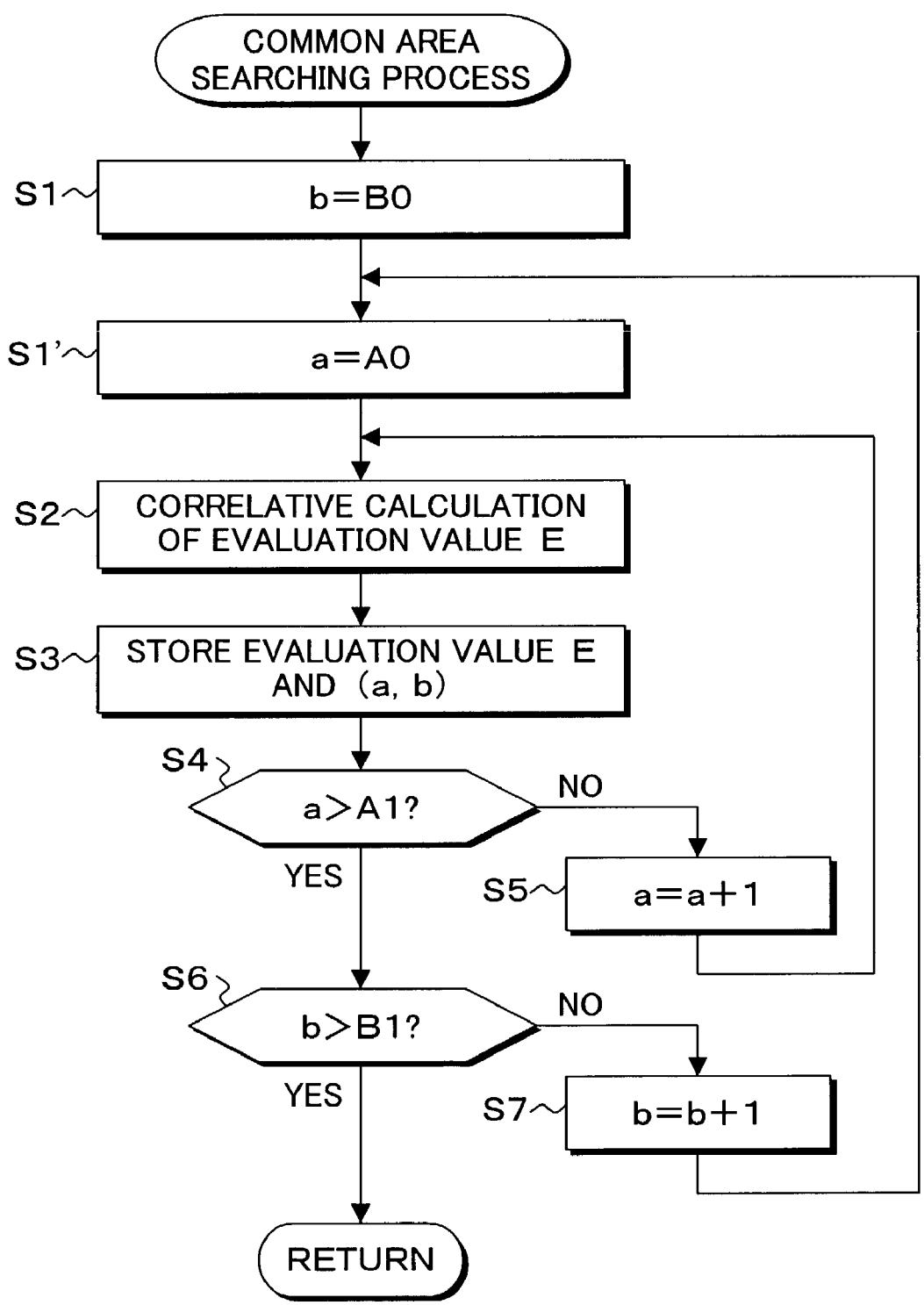
FIG. 10 is a flow chart of a concrete procedure of the common area searching process in FIGS. 9A and 9B.

FIG. 10 is a flow chart showing a procedure of correlative calculation which is performed while moving in two fingerprint section images which are chronologically continuous in a common area searching process using different characteristic portions in step S1, step S4, step S6, and step S8 in FIG. 9. This common area searching process will be described below by exemplifying a case in which a fingerprint dot pattern in FIG. 11 is subjected to the common area searching process. Common areas 58-1 and 58-2 which are overlapping portions in dot patterns 60-1 and 60-2 of two fingerprint section images 40-1 and 40-2 which are chronologically continuous are searched, and the section images are connected to each other such that the common areas 58-1 and 58-2 overlap to obtain a connected image 62.

Figure 12A:
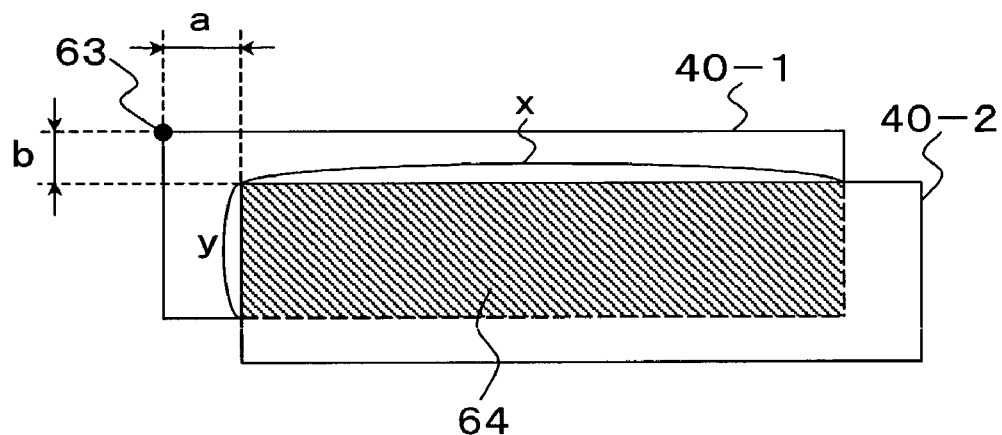
FIGS. 12A and 12B are diagrams for explaining a moving range and correlative calculation of fingerprint section images in the common area searching process.
Figure 12B:
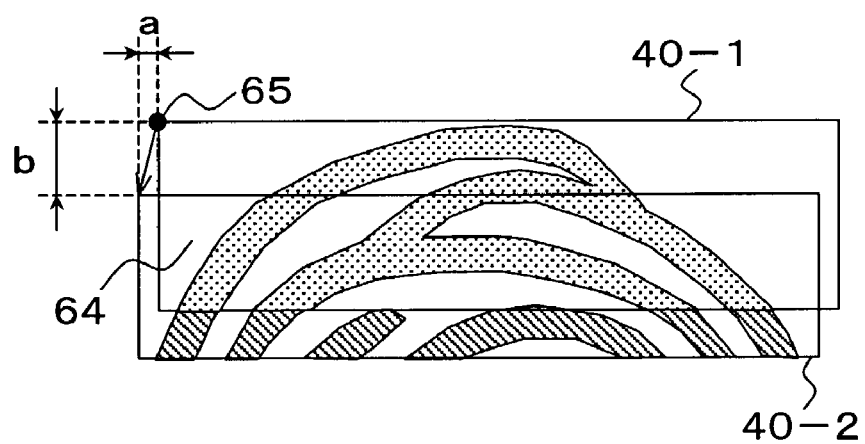

FIGS. 12A and 12B show the positional relationship between the fingerprint section images 40-1 and 40-2 which are chronologically continuous in the common area searching process in FIG. 10. In FIG. 12A, the chronologically preceding fingerprint section image 40-1 is fixed to a two-dimensional plane having an origin 63 as a connection source, and the chronologically following fingerprint section image 40-2 serves as a connection destination. While the fingerprint section images 40-1 and 40-2 are moved in units of a pixel in horizontal and vertical directions, correlative calculation of an evaluation value E is performed to an overlapping area 64 in step S2 in FIG. 11. In this case, an amount of horizontal movement of the fingerprint section image 40-2 which is the connection destination for the fingerprint section image 40-1 which are fixedly arranged is represented by a, and an amount of vertical movement is represented by b, moving ranges are defined as follows:

$A0 \leq a \leq A1$ $B0 \leq b \leq B1.$

More specifically, it is assumed that the maximum moving velocity of a finger is 2 cm/sec and that a sampling frequency of the fingerprint sensor 10 is 30 Hz. In this case, moving ranges of the image are defined as follows:

$-10 \text{ dots} \leq a \leq 10 \text{ dots}$ $0 \text{ dot} \leq b \leq 20 \text{ dots}.$ FIG. 12B shows the overlapping areas 64 in which the secondly input fingerprint section images 40-1 and 40-2 is moved with respect to the fingerprint section image 40-1 fixed to an origin 65 to match the overlapping areas 64 such that an evaluation value E is maximum by correlative calculation. A moving vector (a, b) constituted by an amount of horizontal movement a and an amount of vertical movement b with respect to the origin 65 when the overlapping areas 64 completely match is detected as an amount of movement.

FIG. 13 is a fingerprint section image showing another example of limitation when moving ranges are determined by the common area searching process in FIGS. 9A and 9B. This fingerprint section image 40-1 shows a case in which ridges in the section image of fingerprint ridges are aligned in the form of stripes in the same direction. When two section images serving as a striped edge pattern like the fingerprint section image 40-1 are connected to each other by the common area searching process, an error that the two section images are connected to each other by searching a position where the ridge edge pattern is shifted by one ridge easily occurs. Therefore, the horizontal moving range of an image in the searching process shown in FIG. 12A is limited to a range which is narrower than the interval of striped edge patterns of fingerprint ridges which are statistically calculated or an interval of edges reflected on the image. In this manner, since the correlative calculation in the overlapping areas 64 obtained by moving the section images in FIG. 12B is performed within a range which does not exceeds the interval of the striped edge patterns, an error that images are connected to each other by searching a position where the images are shifted from each other by one edge pattern can be reliably prevented.

FIGS. 14A and 14B show another limitation of a searching range of a fingerprint section image in the common area searching process in FIGS. 9A and 9B. In this case, searching is performed by correlative calculation of overlapping areas in areas except for the peripheries of the partial read images. FIG. 14A shows a peripheral fixing frame which is arranged for the fingerprint sensor 10 on the surface of a compact device such as a portable phone to read the fingerprint of the finger 48. When the finger 48 is pressed on the fixing frame, although the skin is brought into contact with the read surface center, the skin is separated from the peripheral portion of the fixing frame, and the fingerprint pattern cannot be easily read. As shown in FIG. 14B, foreign materials 68 such as dust or water droplets are easily adhered to the peripheral portion of the fingerprint sensor 10 on the fixing frame 11 side, the fingerprint pattern cannot be correctly read because of the adhesion of the foreign materials 68. In addition, since the fingerprint ridges are discontinued at the upper and lower ends of the fingerprint section image, the tangent directions of the ridges cannot be accurately calculated. Therefore, in the common area searching process in FIG. 10, the peripheral portion of a fingerprint section image obtained by a reading operation of the fingerprint sensor 10 is excluded from a searching area, and a central fingerprint section image obtained by removing the peripheral portion is subjected to the searching process.

The procedure of the common area searching process in FIG. 10 will be described below with reference to FIGS. 12A and 12B. In steps S1 and S1', the fingerprint section image 40-2 which is relatively moved with respect to the fingerprint section image 40-1 fixed to the origin 63 is sequentially set at an initial position expressed by b=B0 and a=A0. In step S2, correlative calculation is performed to both the overlapping areas 64, i.e., dot images serving as ridge binary images shown in step S1 in FIG. 9A when the section images are set at the initial position, so that an evaluation value E is calculated. As the correlative calculation of the evaluation value E, the following equation is calculated:

$$E = \sum_i \sum_j f(i, j)g(x-i, y-j). \quad (1)$$

In this equation, E=E(x, y) is satisfied, and f(i, j) and g(x−i, y−j) indicate the fingerprint section image 40-1 and the fingerprint section image 40-2, respectively. More specifically, in the overlapping areas 64 in FIGS. 12A and 12B, a sum of products of pixel values of overlapping dots is calculated for pixel values 0 and 1 at which dot patterns of ridge images are obtained. The sum of product is set as the evaluation value E. More specifically, a dot in the overlapping areas 64 is expressed by one of (1, 1), (1, 0), (0, 1), (0, 0), and a multiplication result of an overlapping portion at which a pixel value of 1 is obtained is 1. In this manner, the pixel value of the overlapping areas 64 is calculated as 1, i.e., the number of overlapping black dots is calculated as the evaluation value E. Therefore, the evaluation value E obtained by the correlative calculation increases as the degree of matching between the section images increases, and the evaluation value E becomes maximum when the section images are set in a matching state. In step S2 in FIG. 10, the evaluation value E is calculated by the correlative calculation. In step S3, the calculated evaluation value E and a moving vector (a, b) obtained when the evaluation value E is obtained are stored. If an amount of horizontal movement a is smaller than an uppermost value A1 in step S4, the amount of movement a is increased by 1 dot in the horizontal direction in step S5, and the correlative calculation of the evaluation value E in step S2 is repeated. When the amount of horizontal movement a reaches the uppermost value A1 in step S4, the control flow shifts to step S6. Until the amount of horizontal movement a reaches an uppermost value B1, while an amount of vertical movement b is increased one by one in step S7, the correlative calculation of the evaluation value E in step S2 and the storage in step S3 are repeated through step S1'. In steps S1 to S6, the evaluation value E=E (a, b) at each moving position is calculated within the ranges of A0≦a≦A1 and B0≦b≦B1. The control flow returns to, e.g., step S2 in FIG. 9A to decide whether the calculated evaluation values include the significant maximum value or not. This decision of the significant maximum value means that, for example, a value obtained by dividing the evaluation value E by the area of the overlapping areas, i.e., the area of the overlapping areas 64 in FIG. 12A is a predetermined value or more. A moving vector (a, b) of the maximum evaluation value E is acquired as an amount of movement in step S11. In step S2 in FIG. 9A, when the significant maximum value cannot be decided in the searching process performed by the correlative calculation of dot patterns serving as ridge binary images, a common area searching process using ridge edge lines in steps S3 to S5 is performed. In the common area searching process using the ridge edge lines, an extending process of the ridge edge lines is performed in step S3.

Figure 15A:
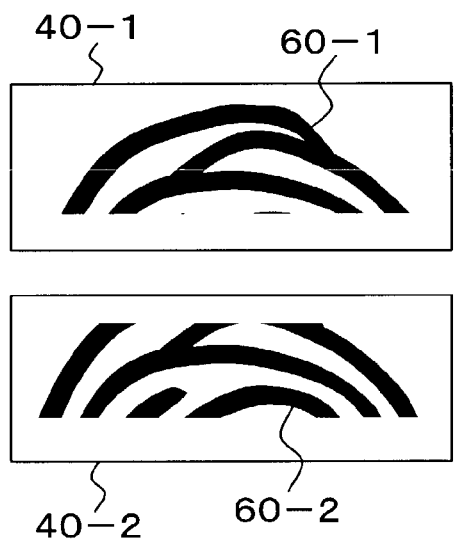
FIGS. 15A and 15B are diagrams for explaining extraction of edge lines from edge binary images of fingerprint ridges.
Figure 15B:
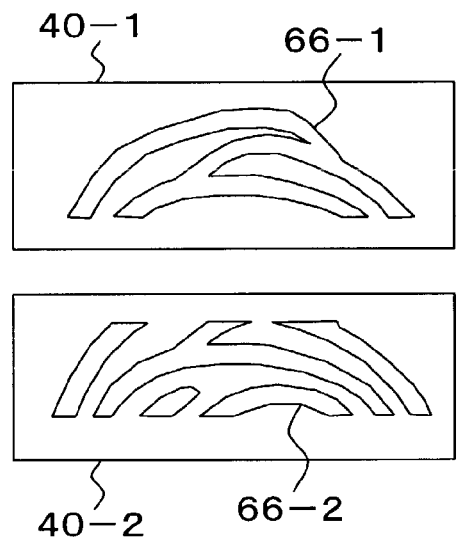

FIGS. 15A and 15B are diagrams for explaining an extraction state of an edge pattern to a dot pattern subjected to the common area searching process in steps S3 to S5 in FIG. 9A. FIG. 15A shows dot patterns 60-1 and 60-2 in the fingerprint section images 40-1 and 40-2 which are chronologically continuous and which are subjected to the common area searching process at the beginning. When common area searching for the dot patterns 60-1 and 60-2 is not succeeded, the common area searching process is performed by edge patterns 66-1 and 66-2 as shown in FIG. 15B. Also in the common area searching process using the edge patterns, as in step S4 in FIG. 9A, an evaluation value E is calculated by the same sum-of-product calculation as the correlative calculation of the dot patterns serving as ridge binary images in step S1. However, when the correlative calculation is performed while shifting a position between the edge patterns 66-1 and 66-2 as shown in FIG. 15B, the skin of a finger expands or contracts when the finger is brought into contact with the fingerprint sensor 10 and slid, and edge lines become unstable, and correlative calculation using the edge lines as character portions also becomes unstable.

The correlative calculation is performed after correction for expanding an edge pattern is performed as shown in FIG. 16. In this case, the edge pattern is expressed by a dot pattern level. It is assumed that, to a chronologically preceding connection source edge pattern 112, a chronologically following connection destination edge pattern 114 is set. When the connection source edge pattern 112 and the connection destination edge pattern 114 are matched while shifting both the edge patterns one by one without performing expansion correction, 6 dots match in a connection destination edge pattern 118 in which the images completely overlap, and 5 dots match in a matching pattern 116 in which the images are shifted by 1 dot on the right side and shifted by 1 dot on the lower side. A difference between the number of overlapping dots obtained when the images are further shifted by 1 dot and the number of overlapping dots obtained in matching is small, a significant evaluation value cannot be obtained, and the correlative calculation becomes unstable. Therefore, in the present invention, as in an expanded pattern 120, dot interpolation is performed such that the dot pattern 114 serving as a connection destination is expanded by 1 dot in, e.g., the horizontal direction. When the expanded pattern 120 and the dot pattern 112 are matched, the number of matched dots increased to 9, a difference between the number of overlapping dots obtained in the matching state and the number of overlapping dots obtained in an non-matching state in which the images are shifted by one dot increases, the maximum value of evaluation values obtained by the correlative calculation depending on the number of overlapping dots can be stably obtained. After the expansion process of the ridge edge line in the expanded pattern 120 is performed in-step S3 in FIG. 9A, the evaluation value E is calculated by the correlative calculation of edge patterns extracted as character shapes in two fingerprint section images which are chronologically continuous in step S4. When the significant maximum value at which the number of overlapping dots exceeds a predetermined rate of the number of dots of the edge patterns is decided in step S5, a moving vector (a, b) of the maximum evaluation value E is acquired as an amount of movement in step S10.

Figure 17:
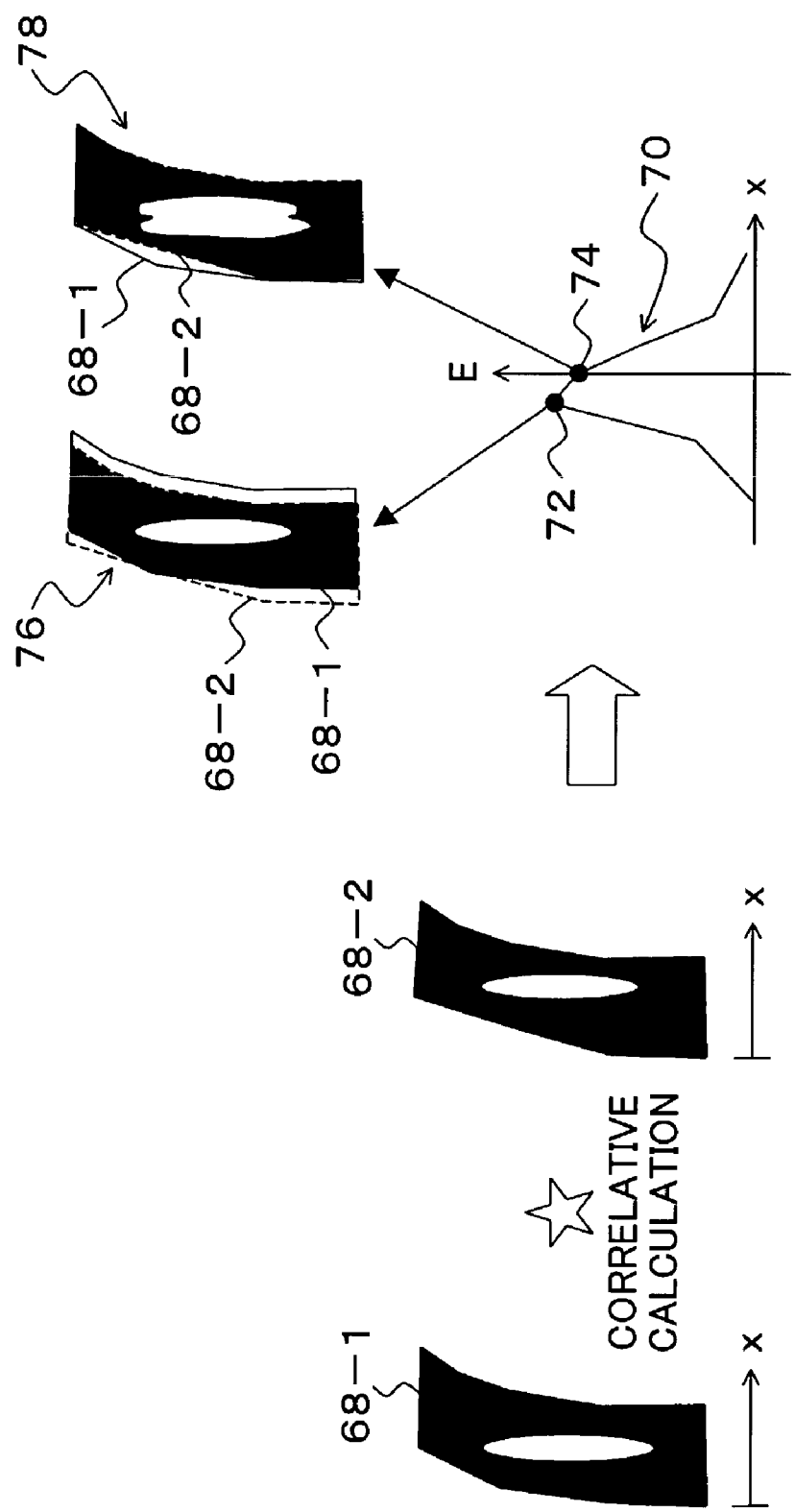
FIG. 17 is a diagram for explaining the maximum value of evaluation values obtained by correlative calculation of binary shapes and an evaluation value obtained when edge lines match.

FIG. 17 is a diagram for explaining a common area searching process by correlative calculation using dot patterns serving as ridge binary images in step S1 in FIG. 9A. When the correlative calculation is performed between dot patterns 68-1 and 68-2 serving as two fingerprint section images which are chronologically continuous while relatively shifting the dot patterns in an x-axis direction, a change of the evaluation value E indicated by a characteristic curve 70 is obtained. A matching state 76 in which a peak value 72 of the characteristic curve 70 is obtained is determined as a common area searching result. However, in a searching process using dot patterns, the matching state 76 at which the peak value 72 is obtained is not always an overlapping state of the dot patterns 68-1 and 68-2. A more correct matching state between the dot patterns 68-1 and 68-2 is a position of the matching state 78. This is an evaluation value 74 in the characteristic curve 70 and is different from the peak value 72. In such a case, the matching state cannot be accurately detected from the peak value of the evaluation value obtained by the correlative calculation of the dot patterns 68-1 and 68-2. Therefore, in the correlative calculation for the dot images in step S1 in FIG. 9A, when the sufficient maximum value cannot be obtained in step S2, after an expansion process of ridge edge lines shown in FIG. 16 in step S3, the evaluation value E is calculated as following equation by correlative calculation for the ridge edge lines in step S4:

$$E = \sum_i \sum_j f(i, j) g(x - i, y - j) + E \cdot A_1, \quad (2)$$

and the significant maximum value is calculated in step S5. In this equation, reference symbol $A_1$ denotes a constant which expresses a weight of an edge line.

Figure 18:
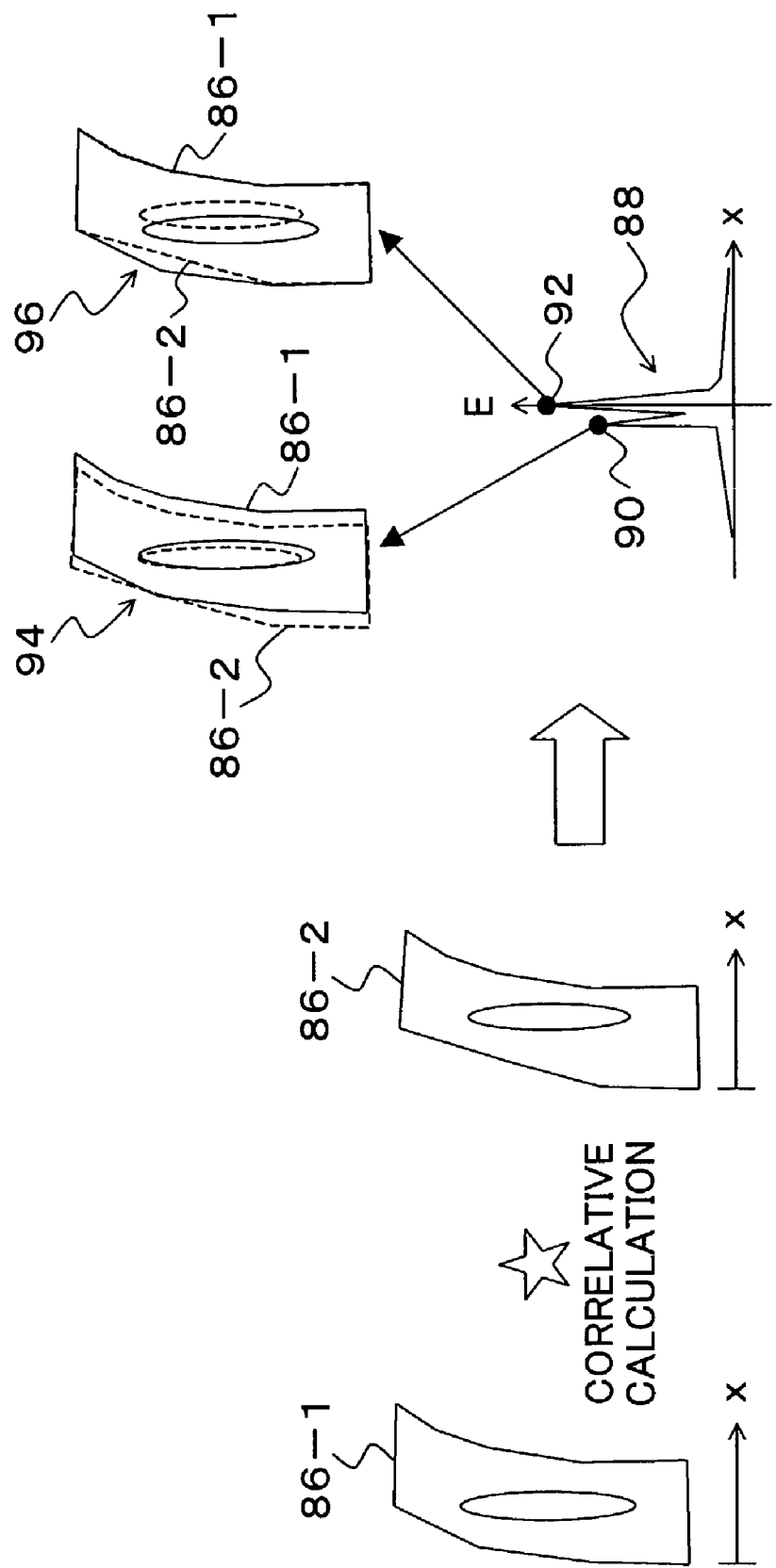
FIG. 18 is a diagram for explaining an evaluation value obtained by correlative calculation of edge lines.

FIG. 18 shows a distribution of evaluation values obtained by correlative calculation for ridge edge lines in step S4 in FIG. 9A and a matching state. In FIG. 18, correlative calculation of edge patterns 86-1 and 86-2 extracted from the same fingerprint section images as those in FIG. 17 is performed while relatively shifting the section images in an x-axis direction, a calculated evaluation value E has a distribution expressed by a characteristic curve 88. A peak value 92 in the characteristic curve 88 represents a matching state 96 which cannot be decided by the correlative calculation of the dot patterns in FIG. 17. By the way, the matching state 76 in which the peak value 72 is obtained by the correlative calculation of the dot patterns in FIG. 17 is a matching state 94 which corresponds to a small value, i.e., an evaluation value 90 on the characteristic curve 88 of the evaluation value E obtained by the correlative calculation of the edge patterns in FIG. 18. According to this relationship, a matching state which is more correct in the common area searching process by correlative calculation using edge patterns having a high degree of character matching than in the common area searching process by correlative calculation for character extraction by dot patterns of fingerprint section images can be found, and image connection can be performed at high accuracy in the common area searching process by the correlative calculation using the edge patterns having a high degree of character matching.

In FIGS. 9A and 9B, when the significant maximum value cannot be obtained in step S5 in the evaluation values E obtained by the correlative calculation of the ridge edge lines in step S4, correlative calculation performed by setting weights depending on changes of the tangent directions of the ridge edge lines is performed in step S6 to calculate an evaluation value E as the following equation:

$$E = \sum_i \sum_j (i, j)g(x - i, y - j) + E \cdot A_2, \quad (3)$$

so that a common area searching process which obtains a matching state is executed. In this equation, reference symbol $A_2$ denotes a constant which expresses a weight in a tangent direction.

Figure 19B:
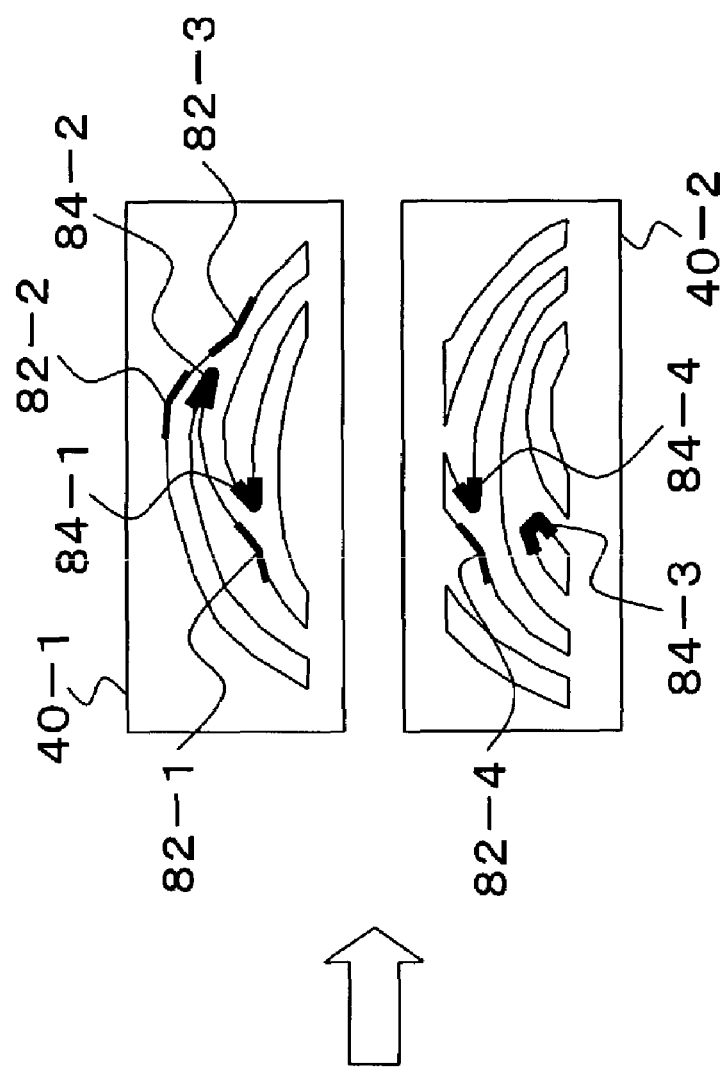
FIGS. 19A and 19B are diagram for explaining extraction of a portion where a change of a tangent direction is large from edge lines of fingerprint ridges.
Figure 19A:
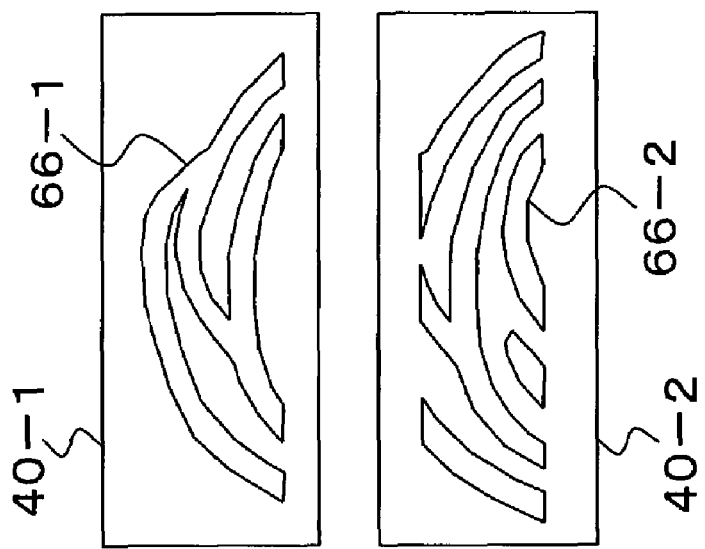

FIGS. 19A and 19B show edge patterns obtained when correlative calculation by setting weights to changes of tangent directions of ridge edge lines and a portion where a change of a tangent direction is large and which is detected from the edge pattern. FIG. 19A shows the edge patterns 66-1 and 66-2 extracted from two fingerprint section images 40-1 and 40-2 which are chronologically continuous as in FIG. 15B. When portions where changes of tangent directions are large are detected in the edge patterns 66-1 and 66-2, the patterns shown in FIG. 19B are obtained. In the fingerprint section images 40-1 and 40-2 in FIG. 19B, the width of a line increases in proportion to the change of the portion where a change of a tangent direction is large. More specifically, character portions 82-1 to 82-4 are portions where changes of tangent directions are relatively large, and character portions 84-1 to 84-4 are portions where changes of tangent directions are more large.

Figure 20:
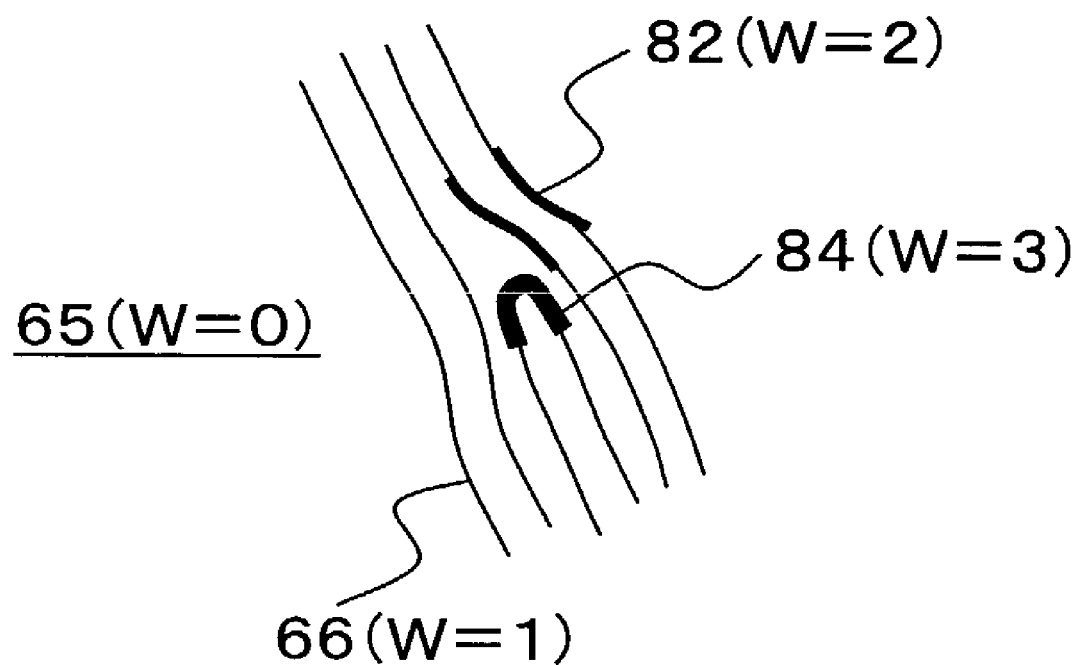
FIG. 20 is a diagram for explaining a weight setting depending on a change of a tangent direction.

In step S6 in FIG. 19B, with respect to the changes of the tangent directions, for example, as shown in FIG. 20, a weight w=0 is set to a background portion 65, a weight w=1 is set to an edge line 66, a weight w=2 is set to a character portion 82 where a change of a tangent direction is large to some extent, and a weight w=3 is set to a character portion 84 where a change of a tangent direction is large to some extent. The weights set for the respective character portions are determined as values of the dots, and evaluation values E are calculated by correlative calculation using the following equation:

$$E = \sum_i \sum_j f(i, j)g(x - i, y - j) + E \cdot A_3. \quad (4)$$

In this equation, reference symbol $A_3$ denotes a constant which expresses a weight. For example, as shown in FIG. 20, the constant is expressed by a set weight value. When the evaluation values E are calculated by the correlative calculation by weight setting depending on the degrees of the character portions, the value of the evaluation value E increases as the degree of matching between character portions having large weights, i.e., the portions having high degrees of character, and the maximum evaluation value E is obtained in a matching state in which portions having large weights and high degrees of character overlap. As a result, an amount of movement for correct connection can be detected by common area searching which emphasizes a character portion of a fingerprint ridge. In addition, detection of an amount of movement for correct image connection which is not easily adversely affected by distortion or noise of an image by expansion and contraction of a skin caused by pressing a finger can be stably realized.

In a change of a tangent direction of a ridge edge line in step S6 in FIG. 9B, when the significant maximum value cannot be obtained in step S7 in the common area searching process performed by correlative calculation based on weighting, the control flow shifts to step S8, the sufficient maximum value in step S9 is decided by calculation of the evaluation value E obtained by correlative calculation in which weights are set to character portions such as a branch point and an end point of a ridge edge line, so that an amount of movement can be detected from a moving vector of the maximum evaluation value.

Figure 21:
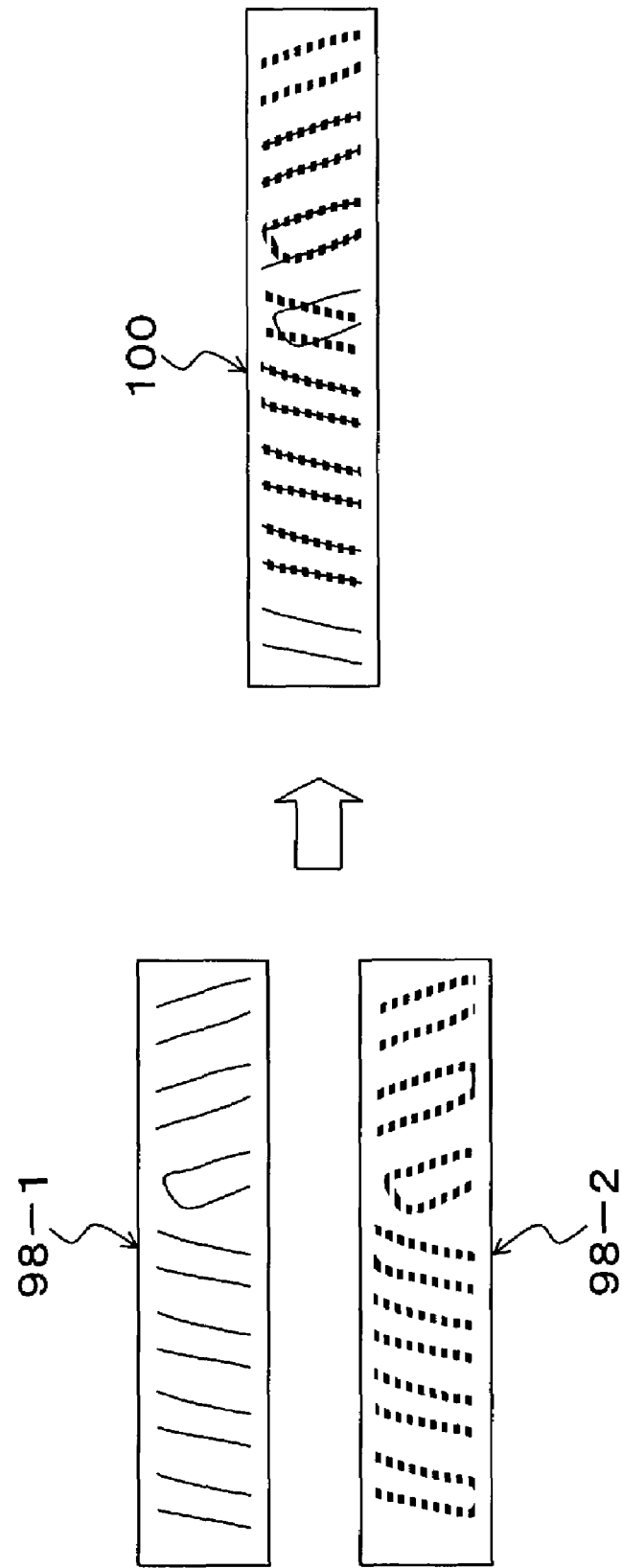
FIG. 21 is a diagram for explaining a connection error in striped edge lines.
Figure 22:
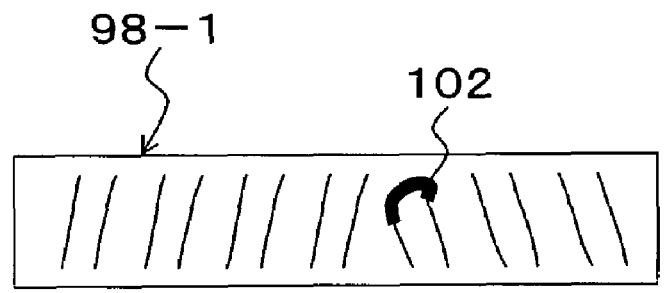
FIG. 22 is a diagram for explaining a portion where a change of a tangent direction is large and which is included in the striped edge lines.

FIG. 21 shows a problem caused when common areas are searched by correlative calculation using an edge pattern as a character portion. Common area searching process of two edge patterns 98-1 and 98-2 which are chronologically continuous will be performed. In this case, as the edge patterns 98-1 and 98-2, edge patterns in portions in which ridges are aligned at equal intervals in the form of stripes in fingerprint ridges are used. Evaluation values of the edge patterns 98-1 and 98-2 are calculated by correlative calculation, as in a matching state in which the maximum evaluation value is obtained, e.g., a matching state 100, the edge pattern 98-2 may be horizontally shifted from the edge pattern 98-1. As shown in FIG. 22, for example, a character portion 102 where a change of a tangent direction is sharp is detected in the edge pattern 98-1, and common area searching is performed by correlative calculation performed by setting weights depending on changes of tangent directions in step S6 in FIG. 9B.

Figure 23A:
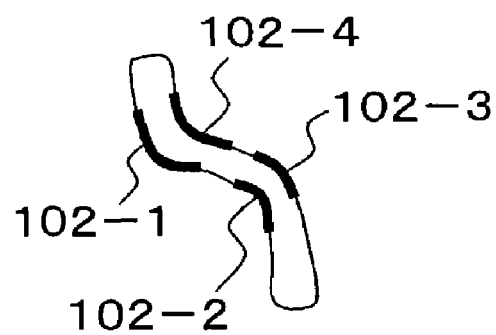
FIGS. 23A and 23B are diagrams for explaining portions where changes of tangent directions of ridge edge lines are large.
Figure 23B:
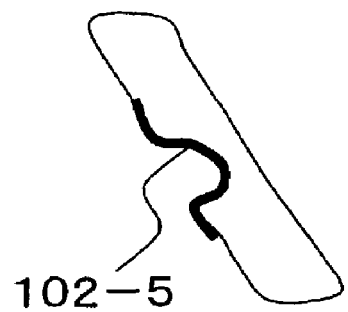
Figure 24A:
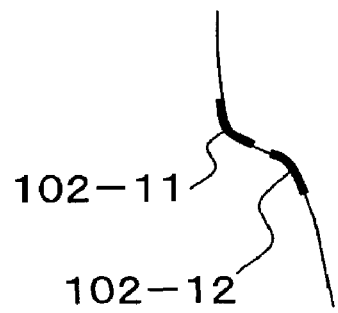
FIGS. 24A and 24B are diagrams for explaining portions where changes of tangent directions are large in skeletal lines generated from the edge lines in FIGS. 25A and 25B.
Figure 24B:
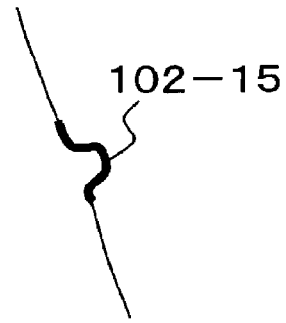

FIGS. 23A and 23B show other examples of edge patterns. Character portions 102-1 to 102-5 where changes of tangent directions are sharp are detected, and common areas are detected by correlative calculation by weight setting depending on the sizes in the tangent directions. In this case, a problem caused by the correlative calculation of the edge patterns shown in FIG. 21 can be solved. Detection of the character portion where a change of a tangent direction may be performed by converting the character portion into skeletal lines shown in FIGS. 24A and 24B. The skeletal lines are obtained by calculating center lines of the edge patterns of the fingerprint ridges in FIGS. 23A and 23B. Portions 102-11, 102-12, and 102-15 where changes of tangent directions are sharp with respect to the skeletal lines are calculated, and common area searching is performed by correlative calculation performed by weighting the character portions where the changes of the tangent directions of the skeletal lines are sharp.

Referring to FIG. 9B again, in the common area searching by correlative calculation by weight setting depending on changes of tangent directions of ridge edge lines or skeletal lines in step S6, if the sufficient maximum value cannot be obtained in step S7, the control flow shifts to step S8. Evaluation values are calculated by correlative calculation performed by setting weights to branch points and end points of the ridge edge lines, and the maximum value of the evaluation values is decided in step S9 to search common areas. The common area searching using the end points and the branch points on the ridge edge lines as weights avoids an error of common area searching caused by image deformation occurring when ridges are read by the fingerprint sensor 10. More specifically, since a skin easily expands or contracts when a finger is pressed on the fingerprint sensor 10, when the finger is slid on the fingerprint sensor 10, the striped ridges as shown in FIG. 21 are deformed. The deformation constantly changes with movement of the finger, and common areas are not appropriately searched from portions where changes of tangent directions of the ridges are sharp. Therefore, as more reliable character portions in fingerprint ridges, end pains and branch points of the ridges are used.

Figure 25A:
FIGS. 25A and 25B are diagrams for explaining an end point and a branch point in the edge lines in FIGS. 25A and 25B.
Figure 25B:
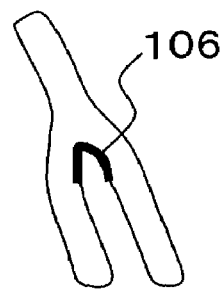

FIG. 25A shows an edge line having an endpoint, and FIG. 25B shows an edge line having a branch point. On the edge lines shown in FIGS. 25A and 25B, an end point 104 and a branch point 106 can be extracted by detecting portions 104 and 106 where changes of tangent directions of the edge lines. In this case, when the portion where the change of the tangent direction is sharp is not defined as the end point 104 or the branch point 106, and when the directions of the start point and end point of a portion where a change of a tangent direction is sharp are traced. the end point 104 or the branch point 106 can be defined by checking that the start point and the end point have the same direction.

Figure 26A:
FIGS. 26A and 26B are explaining an end point and a branch point in skeletal lines generated from the edge lines in FIGS. 25A and 25B.
Figure 26B:
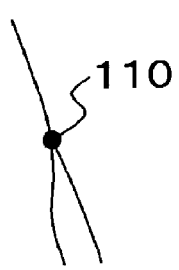

FIGS. 26A and 26B shows a case in which the edge patterns shown in FIGS. 25A and 25B into skeletal lines. An end point 108 in FIG. 26A can be easily detected on the skeletal line, and a branch point 110 in FIG. 26B can be easily decided since the number of skeletal lines extending from the branch point 110 is three or more. As shown in FIGS. 25A and 25B and FIGS. 26A and 26B, end points and branch points are detected as character portions from edge patterns or skeletal lines. Accordingly, a sufficiently large weight w=4 is set to the branch point and the end point detected as character portions in step S8 in FIG. 9B. As in FIG. 20, a weight w=0 is set to a background, and a weight w=1 is set to an edge line and a skeletal line. An evaluation value E is calculated by correlative calculation using the weights, so that common areas are searched on the basis of the maximum value.

Figure 27:
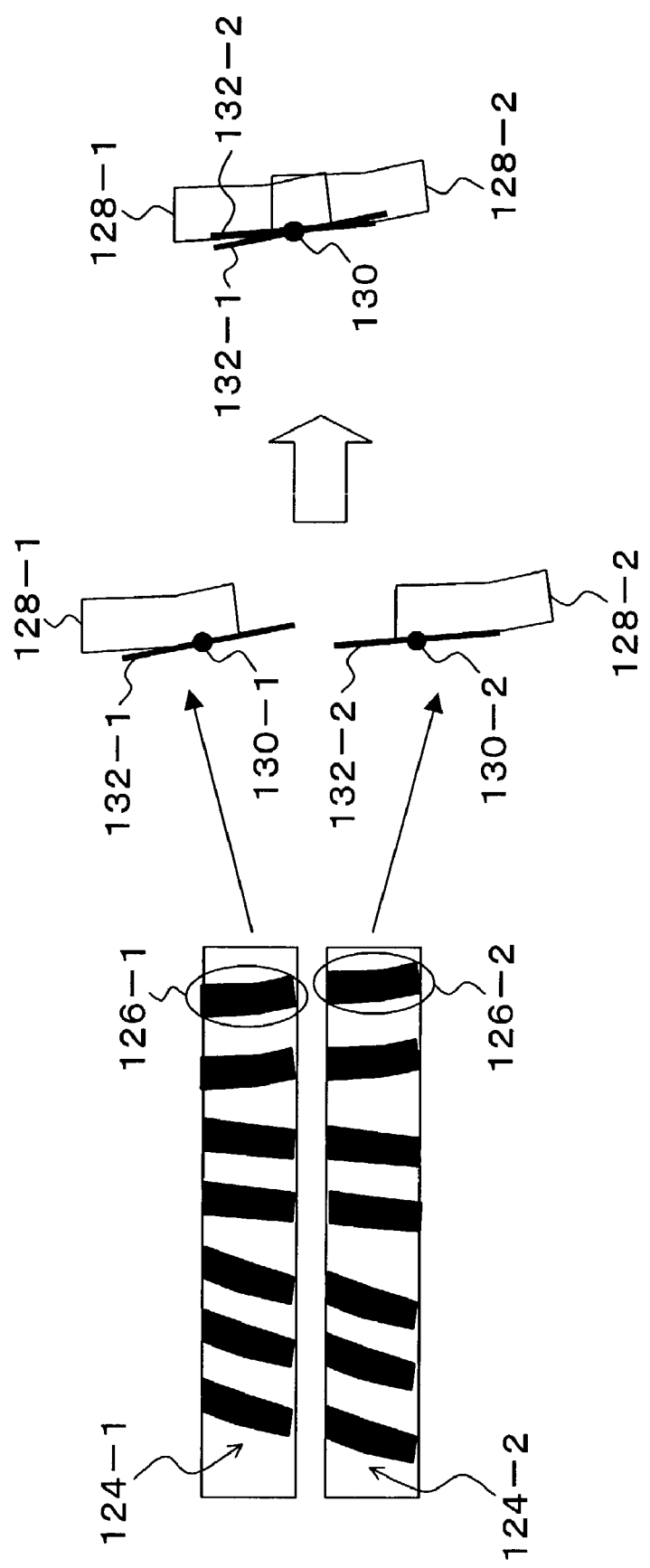
FIG. 27 is a diagram for explaining a searching process by a necessary and sufficient condition for connection in a common area searching process in FIGS. 9A and 9B.

A searching process by a necessary and sufficient condition for connection of ridge edge lines in step S10 in FIG. 9B will be described below. This searching process is performed when a common area searching process which uses the dot patterns of ridges, ridge edge lines, changes of tangent directions of ridges, and branch points and end points of the ridge edge lines in previous steps S1 to S9 as character shapes are not succeeded. FIG. 27 shows an outline of a searching process performed by the necessary condition for connection in step S10 in FIG. 9B. In connection between two fingerprint section images 124-1 and 124-2 which are chronologically continuous, when edge lines are extracted from, e.g., ridges 126-1 and 126-2 like edge patterns 128-1 and 128-2, the fingerprint section images are connected such that a condition that "connection points match and a change of a tangent direction at the connection points is smooth" is satisfied as a necessary and sufficient condition for smoothly connecting curves to each other. For example, on the edge patterns 128-1 and 128-2, when the connection points are represented by 130-1 and 130-2, respectively, the tangent directions of the connection points 130-1 and 130-2 are calculated. As a result, tangent lines 132-1 and 132-2 are obtained. The edge patterns 128-1 and 128-2 are matched at a point 130 at which the connection points 130-1 and 130-2 are overlapped as shown on the right side of FIG. 27, and a relationship between the tangent lines 132-1 and 132-2 is checked. In this case, when a condition that "connection points match and a change of a tangent direction at the connection points is smooth" which is a necessary and sufficient condition for smoothly connecting curves to each other is satisfied, more specifically, when changes of the tangent lines 132-1 and 132-2 when the images are overlapped at the connection point 130 are equal to or smaller than a predetermined value or correspond to about changes of tangent directions of peripheral edges, it is considered that the necessary and sufficient condition is satisfied for smoothly connecting the curves to each other is satisfied, and the two edge patterns are connected to each other.

Figure 28A:
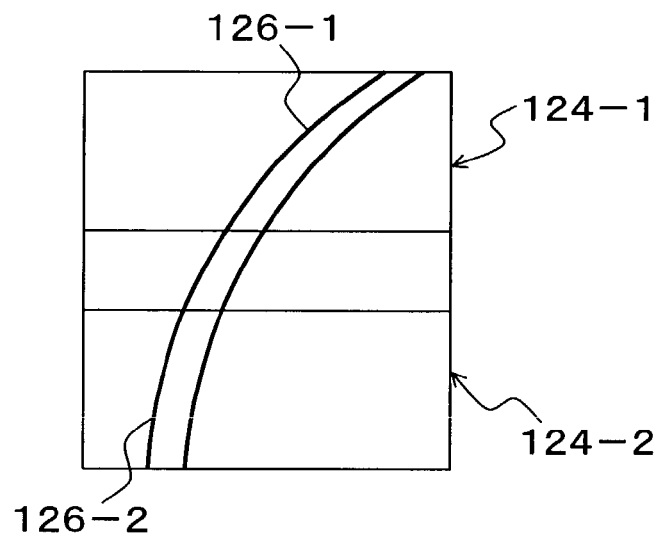
FIGS. 28A and 28B are diagrams for explaining a searching process of a connection point which satisfies the necessary and sufficient condition for connection.
Figure 28B:
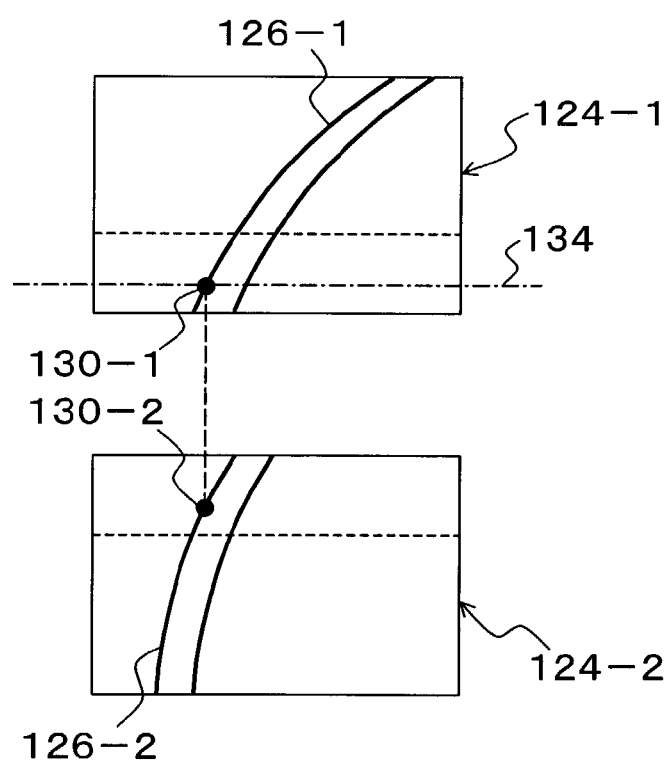

FIGS. 28A and 28B explain a procedure of a common area searching process performed by a necessary and sufficient condition for smoothly connecting curves to each other such that one fingerprint ridge is extracted. FIG. 28A shows a reading state of the fingerprint section images 124-1 and 124-2 which are related to a fingerprint ridge 126 and which are chronologically continuous. In FIG. 28A, overlapping reading is performed a position where the fingerprint section images 124-1 and 124-2 are adjacent to each other. These fingerprint section images 124-1 and 124-2 of the fingerprint ridge 126 are continuously read as shown in FIG. 28B and stored in a storage unit. For this reason, in the common area searching process performed by the necessary and sufficient condition for smoothly connecting curves to each other, a scanning line 134 is set at an introductory area of the overlapping portion of the chronologically preceding fingerprint section image 124-1, and a crossing point between the edge line 126-1 and the scanning line 134 is defined as a connection point 130-1. While the fingerprint section image 124-2 serving as a connection destination is relatively shifted dot by dot with respect to the connection point 130-1 of the edge line 126-1 in the fingerprint section image 124-1, a connection point 130-2 of an edge line 114-2 corresponding to the connection point 130-1 is calculated. The tangent directions of the two connection points 130-1 and 130-2 are detected, and a difference between the two detected tangent directions is calculated. In an actual fingerprint section image, since a plurality of fingerprint ridges are arranged like the fingerprint section images 124-1 and 124-2 shown in FIG. 27, a sum of differences between the tangent directions of pairs of connection points determined for ridge edge lines is calculated as shown in FIG. 29B. In FIG. 28B, while a fingerprint section image 112-2 serving as a connection destination is moved within a predetermined range with respect to a fixed fingerprint section image 112-1 serving as a connection source, a sum of differences of the tangent directions of pairs of connection points is calculated as an evaluation value, and a connection state of an evaluation value which is a finally minimum is calculated as a common area searching process. A positional relationship between the two fingerprint section images at this time is detected as an amount of movement.

Figure 29:
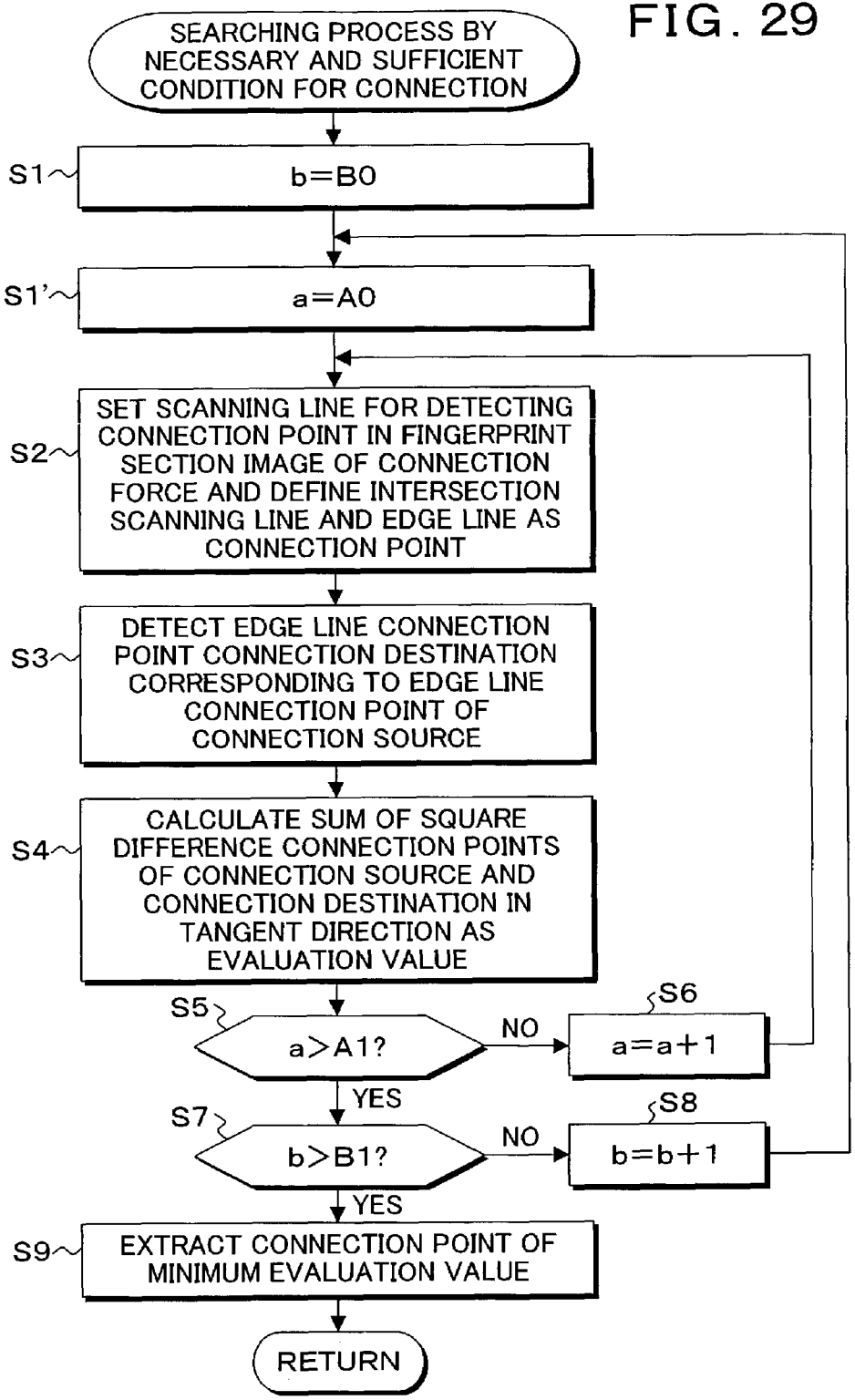
FIG. 29 is a flow chart of a searching process performed by the necessary and sufficient condition for connection.

FIG. 29 is a flow chart showing the details of a searching process performed by a necessary and sufficient condition for connection according to the present invention. In step S1, like the positional relationship obtained in a searching process for two fingerprint section images shown in FIG. 12A, an amount of horizontal movement a of the relatively moved fingerprint section image 40-2 serving as a connection destination with respect to the fixed fingerprint section image 40-1 is an initial value a=A0, and an amount of vertical movement b is given by b=B0. In step S2, as shown in FIG. 28B, the scanning line 134 for detecting a connection point is set in the fingerprint section image 124-1 serving as a connection source as shown in FIG. 28B, and a crossing point between the scanning line 134 and the edge line 126-1 is defined as a connection point 130-1. In step S3, a connection point 130-2 of the edge line 126-2 in the fingerprint section image 124-2 serving as a connection destination corresponding to the edge line connection point 130-1 of the connection source is detected. In step S4, the tangent directions of the connection point 130-1 of the connection source and the connection point 130-2 of the connection destination are calculated, and a sum of square of the difference between the tangent directions is calculated as an evaluation value. It is checked in step S5 whether the amount of horizontal movement a reaches the uppermost value A1. If the amount of horizontal movement a does not reach the uppermost value A1, the amount of horizontal movement a is increased by 1 dot in step S6, and processes following the process in step S2 are repeated. When the amount of horizontal movement a reaches the uppermost value A1, it is checked in step S7 whether the amount of vertical movement b reaches the uppermost value B1. If the amount of vertical movement b does not reach the uppermost value B1, the amount of vertical movement b is increased by 1 dot in step S8, and processes following the process in step S2 are repeated again. When the amount of vertical movement b reaches the uppermost value B1, the control flow shifts to step S9, connection points at which the minimum evaluation value is obtained are extracted. The control flow returns to step S11 in FIG. 9B, the amount of horizontal movement a obtained from the positional relationship between the extracted connection points is acquired. In addition, the control flow returns to step S4 of the main routine in FIG. 7, and a connection process of adjacent fingerprint section images is performed. In FIG. 28B, with respect to the edge line of one fingerprint ridge, the connection points 130-1 and 130-2 of one edge line to calculate a difference between the tangent directions. However, a crossing point between the scanning line and the other edge line is detected, and a sum of differences between tangent directions may be calculated by the same manner as described above.

Figure 30:
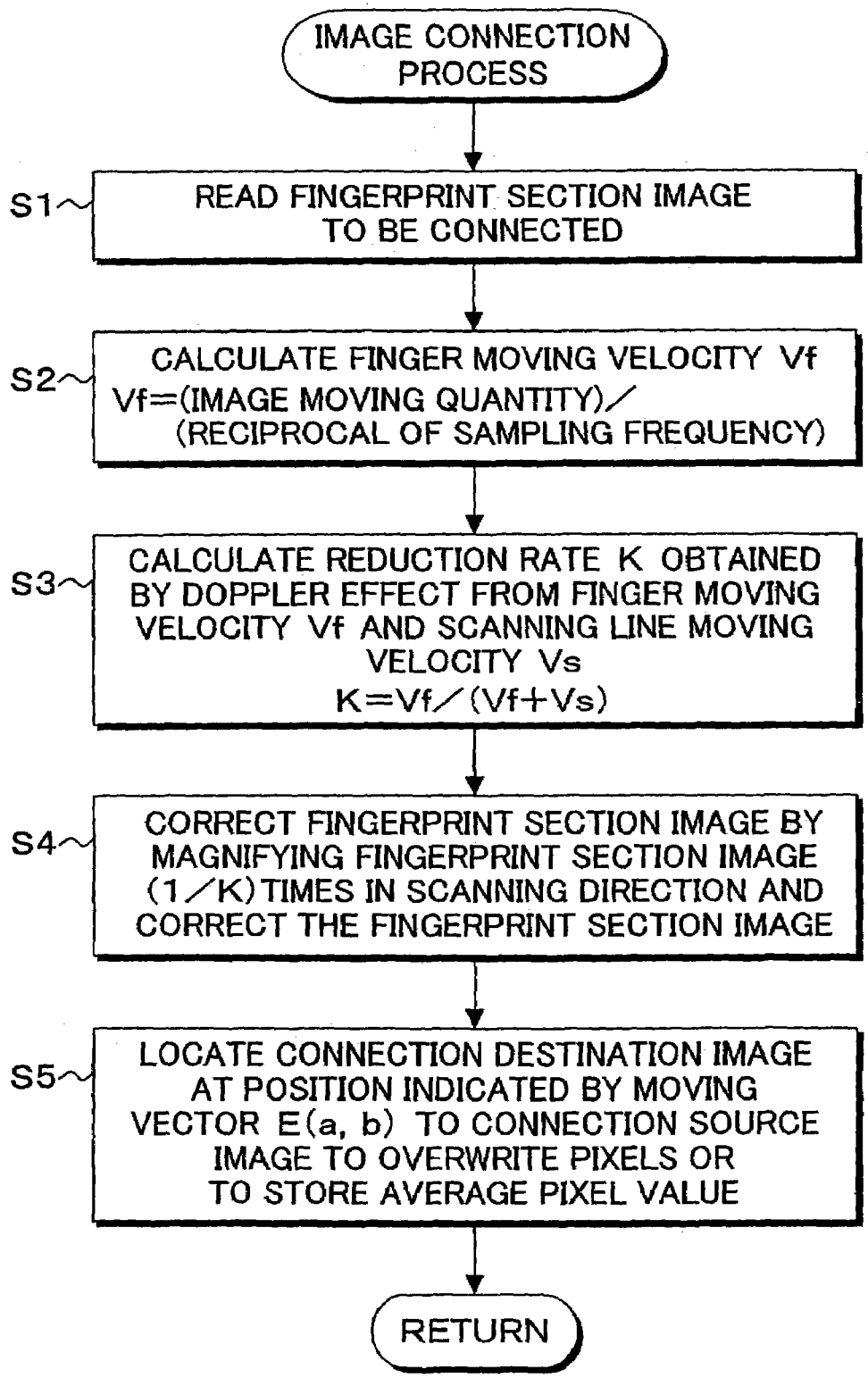
FIG. 30 is a detailed flow chart of an image connection process in FIG. 7.

The details of a connection process of two fingerprint section images which are chronologically continuous in step S4 in the main routine in FIG. 7 will be described below with reference to the flow chart in FIG. 30. In this common area searching process, as in the block diagram in FIG. 1, after distortion of an image caused by Doppler effect is corrected by the image size correction unit 26, an image connection process is performed by the image connection unit 28. In FIG. 30, in the image connection process, fingerprint section images to be connected in step S1 are loaded. Subsequently, in steps S2 to S4, a correction process for correcting distortion of the images caused by Doppler effect is performed. In the image connection unit according to the present invention, as shown in FIG. 4, the moving direction 50 of the finger 48 is set to be opposite to the scanning direction 46 of the fingerprint sensor 10. In this case, loaded images read as shown in FIGS. 5A and 5B are reduced at a moving velocity Vf of the finger and a moving velocity Vs of a scanning line in the fingerprint sensor 10. In this case, the moving velocity Vf of the finger is calculated by dividing an amount of movement obtained as a process result of the common area searching process in FIGS. 9A and 9B by time between the images. The time t between the images is given by the reciprocal of a sampling frequency in the fingerprint sensor 10. Therefore, the moving velocity Vf of the finger is given by the following equation:

Vf=(amount of movement detected by common area searching process)/(reciprocal of sampling frequency).

The moving velocity Vs in the fingerprint sensor 10 is a value obtained by dividing a vertical scanning length in the fingerprint sensor 10 by the sampling frequency. For this reason, a reduction ratio K of the image by Doppler effect is given by Doppler effect is given by the following equation:

Reduction rate=$Vf/(Vf+Vs)$

Therefore, the image reduced by Doppler effect may be corrected to be magnified in the vertical direction by multiplying the reciprocal of the reduction ratio K to the loaded image.

In steps S2 to S4 in FIG. 30, a correction process is performed for Doppler effect is performed. More specifically, the moving velocity Vf of the finger is calculated in step S2, and the reduction ratio K obtained by Doppler effect is calculated from the moving velocity Vf of the finger and the moving velocity Vs in step S3. In step S4, the fingerprint section images are magnified (1/K) times in a scanning direction (vertical direction) to be corrected. Upon completion of the correction process which magnifies the images reduced by Doppler effect, with respect to overlapping areas where the fingerprint section image serving as a connection destination is positioned at a position of a moving vector E (a, b) of the fingerprint section image serving as a connection source, pixels are overwritten, or an average pixel value of two pixel is calculated and stored, so that image connection is performed. As shown in FIGS. 6A and 6B, when the scanning direction 46 of the fingerprint sensor 10 and the moving direction 50 of the finger are equal to each other, the read fingerprint section images are magnified by Doppler effect. In this case, a reduction ratio K is given by the following equation:

$K=Vf/(Vf-Vs)$

Therefore, the fingerprint section image magnified by Doppler effect is subjected to correction in a scanning direction (vertical direction) performed by multiplying the reciprocal (1/K) of the reduction ratio K, and so that the image is reduced in the scanning direction.

Figure 31:
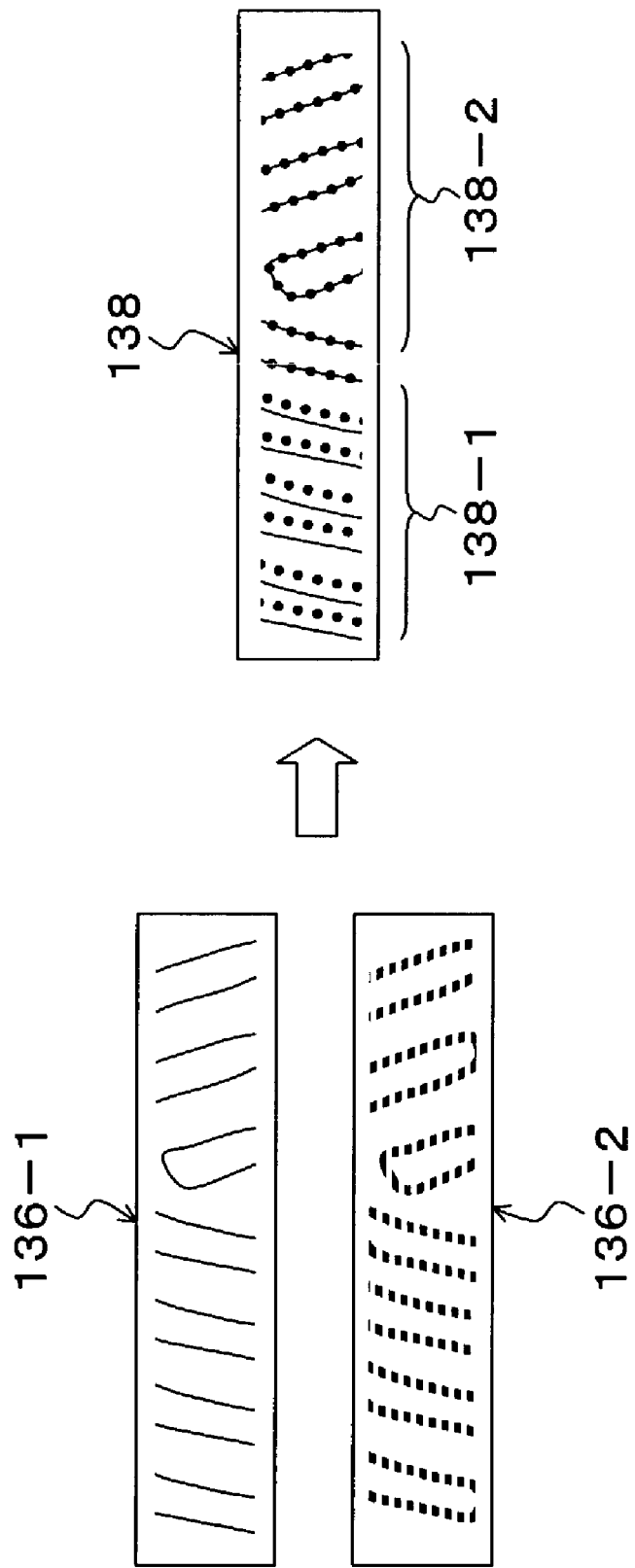
FIG. 31 is a diagram for explaining common area searching of striped edge line images in which distortions occur.
Figure 32:
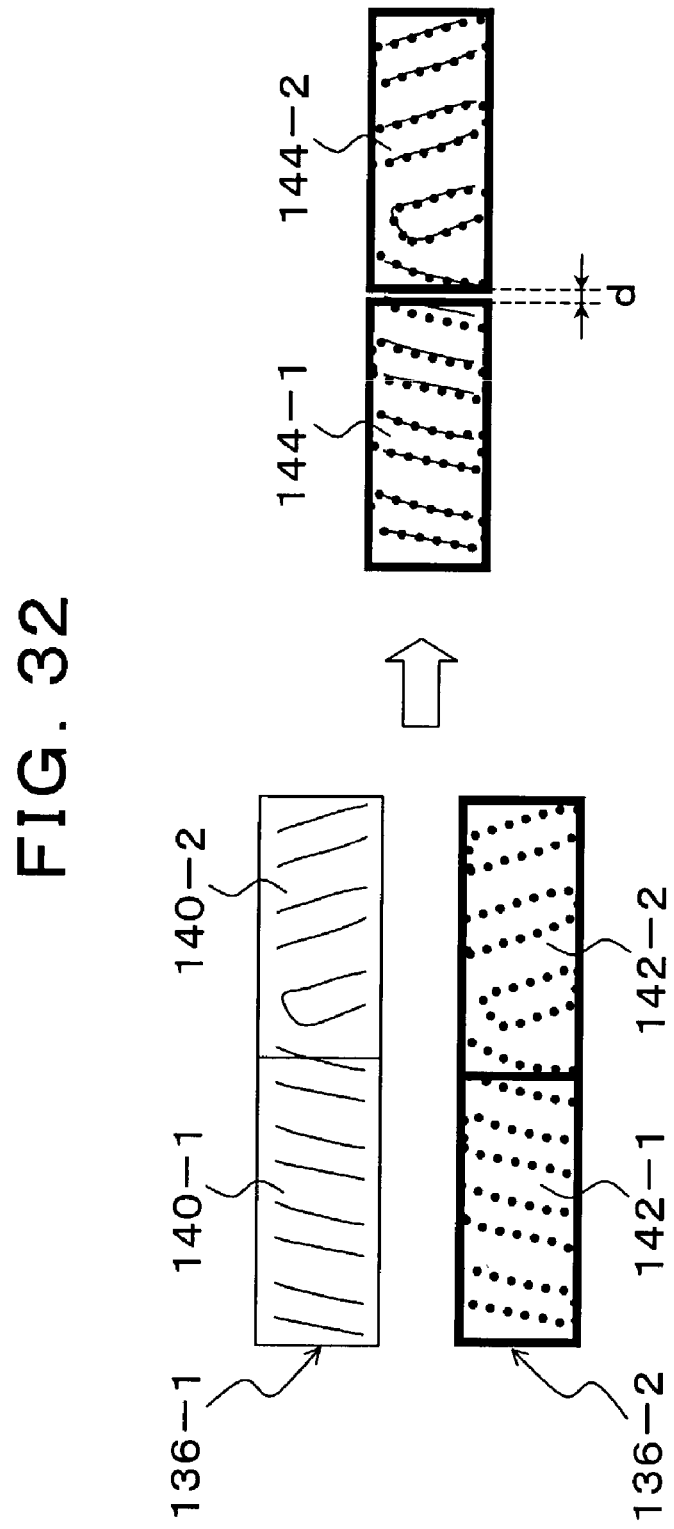
FIG. 32 is a diagram for explaining common area searching of striped edge line images by image division.

As an image connection process according to another embodiment of the present invention, an image connection process in which fingerprint section images which are continuously read and input by the fingerprint sensor 10 are divided in a horizontal direction to perform image connection will be described below. In the fingerprint sensor 10 according to the present invention, when a finger is slid on the sensor to read a fingerprint, the skin expands or contracts meanwhile, and common areas which are completely matched may not be detected in fingerprint section images which are chronologically read. For example, FIG. 31 shows edge patterns 136-1 and 136-2 of a fingerprint section image which expands or contracts in the horizontal direction. When the two edge patterns 136-1 and 136-2 are connected to each other by performing correlative calculation to one of character shapes shown in the common area searching process in FIGS. 9A and 9B, the following state is generated. That is, ridges are exactly matched to each other in a right area 138-2 as in a connection pattern 138, but ridges are not matched in a left area 138-1. When the images are connected to each other in such a state, a step is formed at the connection portion between the ridges, so that a fingerprint section image in which ridges are smoothly connected cannot be obtained. Therefore, in the present invention, as shown in FIG. 32, the two edge patterns 136-1 and 136-2 which are chronologically continuous are divided by, e.g., two in the horizontal direction into divided edge patterns 140-1 and 140-2 and divided edge patterns 142-1 and 142-2, and a common area searching process is performed to each divided area. When the searching process to each divided area, the edge patterns are exactly matched in each divided area as in divided matching patterns 144-1 and 144-2 which are shown on the right side of FIG. 32. A gap having a small distance d is generated between the area of the left pattern 144-1 and the area of the right matching pattern 144-2. It is understood that the skin expands in the horizontal direction by a distance corresponding to the distance d. For this reason, an amount of expansion d is calculated from a difference between horizontal divided areas obtained by the common area searching process to the left and right divided areas, and image connection is performed after the fingerprint section images are corrected, so that correct fingerprint section images can be obtained.

Figure 33:
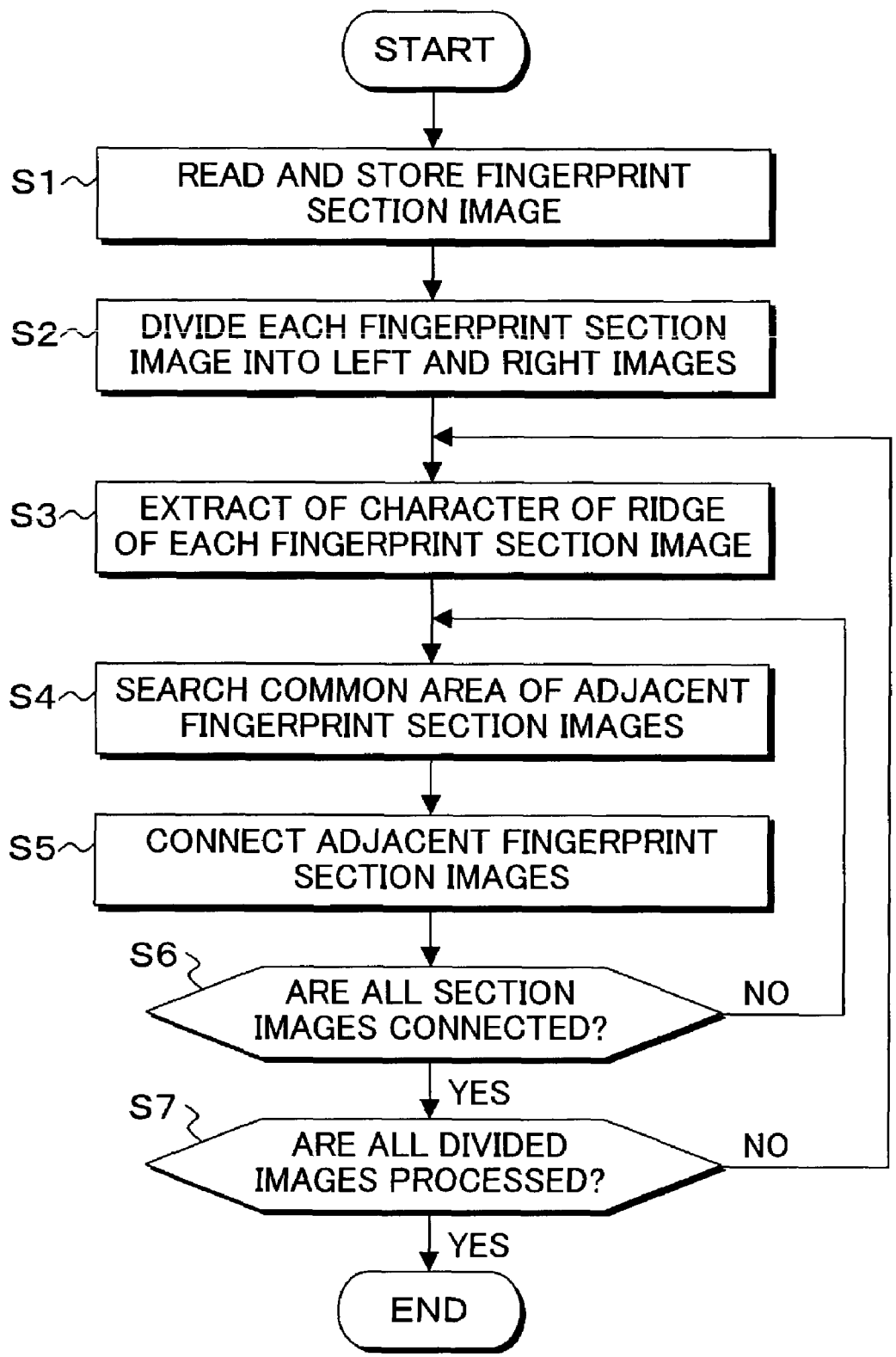
FIG. 33 is a flow chart of an image connection process by image division of the present invention.

FIG. 33 is a flow chart of a procedure of an image connection process according to the present invention in which an image is divided in a horizontal direction. In step S1, a plurality of fingerprint section images are continuously read by scanning a finger on the fingerprint sensor 10 and stored. In step S2, each fingerprint section image is divided by two into left and right images. With respect to the two left and right divided images, characters of ridges of the left divided image are extracted in steps S3 to S5, common area searching and connection of fingerprint section images are performed until all the section images on the left side are connected to each other in step S6. Subsequently, when the process of the divided images is not completely finished in step S7, the control flow returns to step S3, for example, the remaining right divided areas are subjected to the processes of character extraction, common area searching, and image connection in steps S3 to S6. As a matter of course, in the image connection in step S5, when an amount of expansion d which expresses expansion or contraction of the left and right divided areas is detected as shown in FIG. 32, the right image is corrected to eliminate the amount of expansion d, and connection is performed. In addition, in a contraction state in which left and right divided areas overlap, correction is performed such that the left image is horizontally expanded to cancel the amount of contraction. The details of a character extraction process, a common area searching process, and a connection process of fingerprint section images have the same process contents as those of the embodiment in which image division is not performed.

Figure 34:
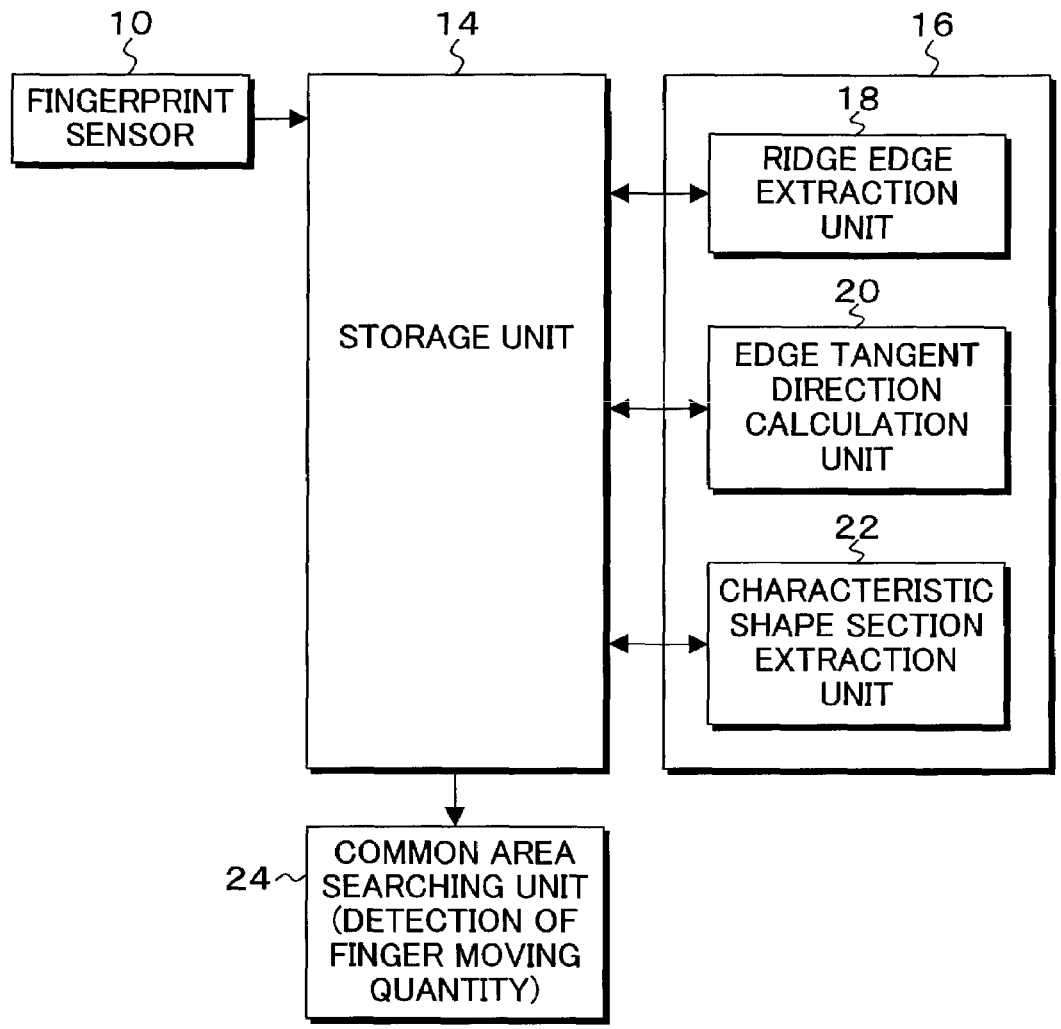
FIG. 34 is a block diagram of a moving amount detection apparatus according to the present invention.

FIG. 34 is a block diagram of a moving amount detection apparatus according to an embodiment of the present invention. The moving amount detection apparatus is constituted by a fingerprint sensor 10, a storage unit 14, a character extraction unit 16, and a common area searching unit 24. In the character extraction unit 16, a ridge edge extraction unit 18, an edge tangent direction calculation unit 20, and a characteristic shape section extraction unit 22 are arranged. This moving amount detection apparatus has the same configuration and operation as those of an apparatus obtained by removing the image size correction unit 26 and the image connection unit 28 from the image connection apparatus in FIG. 1. More specifically, in the embodiment in FIG. 1, a plurality of continuous fingerprint section images read by the fingerprint sensor 10 are connected to each other to form an entire image. However, in the moving amount detection apparatus in FIG. 34, since an amount of movement of a finger can be detected by extracting the maximum value of evaluation values obtained by correlative calculation in the common area searching unit 24, a detection result of the amount of movement of the finger is output to the outside, and can be used. When the moving amount detection apparatus is mounted on a portable phone or a PDA, an amount of movement of a finger detected by the common area searching unit 24 can be used for a change of an inverted select portion displayed on the screen of a portable phone or for movement of a cursor point of a PDA.

Figure 35:
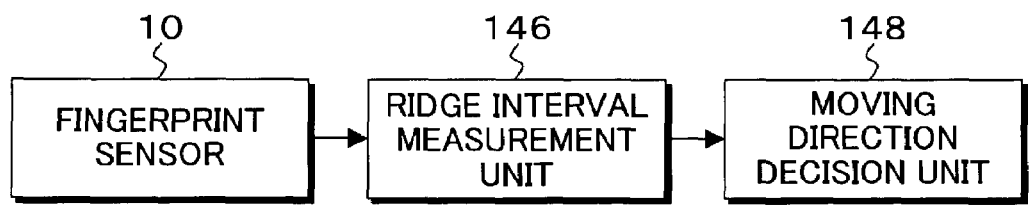
FIG. 35 is a block diagram of a moving direction decision apparatus according to the present invention.

FIG. 35 is a block diagram of a finger moving direction decision apparatus according to an embodiment of the present invention. This moving direction decision apparatus is constituted by a ridge interval measurement unit 146 and a moving direction decision unit 148 of a fingerprint sensor 10. This moving direction decision apparatus detects a moving direction of a finger by using expansion and contraction of an image affected by Doppler effect generated by a moving velocity of the finger and a scanning speed of the sensor when the finger is slid on the fingerprint sensor 10. The change of the image by Doppler effect remarkably appears when a moving velocity of the finger is high.

Figures 36A, 36B:
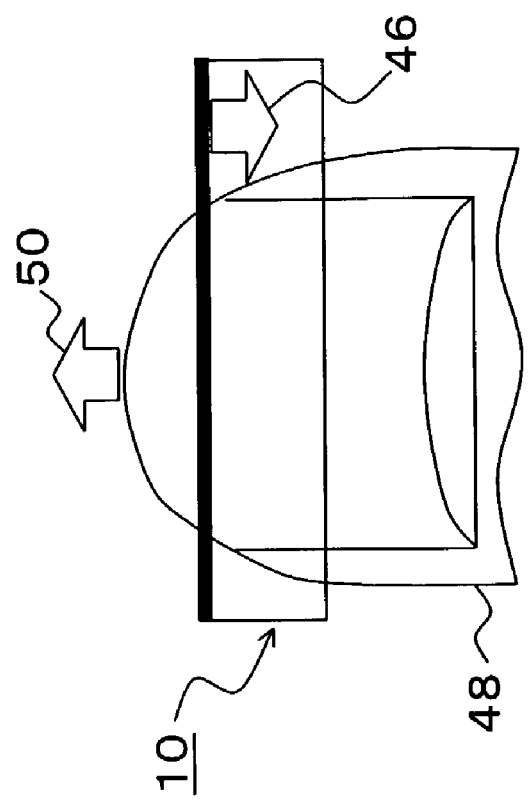
FIGS. 36A and 36B are diagrams for explaining contraction of an image by Doppler effect when a read/scanning direction and a moving direction of a finger are opposite to each other.

FIG. 36A shows a case, a moving direction 50 of a finger 48 is set to be opposite to a scanning direction 46 of the fingerprint sensor 10. A fingerprint section image in this case is shown in FIG. 36B. In a fingerprint section image 150 in FIG. 36B, an interval between ridges 152 decreases due to Doppler effect. FIG. 37A shows a case in which the scanning direction 46 of the fingerprint sensor 10 and the moving direction 50 of the finger 48 are equal to each other. In this case, due to Doppler effect, an interval between ridges 156 increases as in a fingerprint section image 154 in FIG. 37B. Therefore, in the ridge interval measurement unit 146 in FIG. 35, an interval between fingerprint ridges in a section image loaded by moving a finger with respect to the fingerprint sensor 10 is measured, and the interval is output to the moving direction decision unit 148. In the moving direction decision unit 148, a contraction decision value for deciding contraction of a ridge interval caused by Doppler effect and an expansion decision value for deciding expansion of an image caused by Doppler effect are set. When a resultant value is the contraction decision value or less, it is decided that the moving direction 50 of the finger 48 is opposite to the scanning direction 46 as shown in FIG. 36A. When the ridge interval is larger than the expansion decision value, it is decided that the scanning direction 46 is equal to the moving direction 50 of the finger 48 as shown in FIG. 37A. When the direction of the finger moved on the fingerprint sensor 10 is detected by the moving direction decision apparatus, the moving direction decision apparatus can be used in place of a touch pad by using a decision result of the moving direction of the finger. As the fingerprint sensor 10 used for the moving direction of the finger in FIG. 35, not only a small fingerprint sensor to which fingerprint section images are continuously input, but also a fingerprint section images sensor which loads an entire fingerprint by placing a finger on the fingerprint sensor may be used.

As described above, according to the present invention, input images such as sectional fingerprint images continuously picked by a small sensor for a compact device such as a portable phone can be connected to each other at high accuracy to correctly generate an entire image. When a human body part, e.g., a fingerprint is read, the skin expands or contracts when the finger is slid on the sensor to cause distortion in the read image, and an error increases in simple pattern matching. However, in the present invention, as characteristic shapes in fingerprint ridges, not only ridge binary images, but also characteristic ridge patterns such as ridge edge lines, portions where changes of tangent directions of the ridge edge lines are large, end points or branch points of the ridge edge lines are importantly used, so that matching is performed. For this reason, even though small distortion or noise of a ridge is generated, fingerprint section images can be accurately connected to each other to generate an entire fingerprint image.

In particular, one entire fingerprint image is formed by connecting ten and several fingerprint section images to several ten fingerprint section images to each other. When the fingerprint section images are shifted from each other, even though the shift is very small, a considerable connection error is generated in the entire image obtained after the connection. For example, when a connection error of 1% is generated in connection of the fingerprint section images in a direction in which image sizes increase, as an entire image obtained by connecting 20 section images to each other, an entire fingerprint image the size of which increases by 20% is obtained.

Since such a plurality of fingerprint section images can be connected such that portions which are accurately matched are detected as the maximum value of evaluation values obtained by performing correlative calculation to an extraction result of character portions of fingerprint ridges according to the present invention, the section images can be accurately connected to each other by searching common areas for connection at very high accuracy. As a result, a large number of fingerprint section images are connected to each other, a shift of the entire image which is finally obtained can be minimized.

In addition, according to the present invention, although a loaded fingerprint section image expands or contracts due to Doppler effect generated by a scanning speed of the fingerprint sensor and a moving velocity of a finger, an amount of movement of the finger is detected with respect to the expansion and contraction caused by Doppler effect. For this reason, the moving velocity of the finger is calculated, and image correction using a ratio of expansion or contraction of the image caused by Doppler effect is performed, so that fingerprint section images are connected to each other without being affected by distortion caused by Doppler effect. As a result, the accuracy of the entire image which is finally obtained can be improved.

In the image connection process in the above embodiment, as shown in the flow chart of the common area searching process in FIGS. 9A and 9B, the searching processes using dot patterns serving as binary images of fingerprint ridges, edge patterns, changes of ridge directions of the edge lines, or branch points and end points of the edge lines as character shapes for searching common areas and the searching process using a necessary sufficient condition for connection are sequentially arranged. When a preceding searching process is not succeeded, the next searching process is executed. Specific one of the common area searching processes using a plurality of character shapes may be used, or the plurality of searching processes may be combined to each other, and the combinations may be sequentially or simultaneously performed. For example, a process of calculating evaluation values in steps S1, S4, and S8 except for steps S2, S5, and S7 in FIGS. 9A and 9B at once may be performed.

The flow chart in the embodiment corresponds to an embodiment of a program which is executed by a computer which is mounted on a portable device for image connection in the present invention.

The present invention includes appropriate modifications without deteriorating the objects and advantages of the invention. In addition, the present invention is not limited to numerical values described in the embodiments.

What is claimed is:

1. An image connection method, comprising:
using a computer to execute:
continuously inputting fingerprint images by relative movement of a finger in same direction with respect to a read unit sequentially reading biometric portion images of the finger as the fingerprint images;
extracting a first character shapes from two of the input fingerprint images;
calculating, as a first evaluation value, a sum of products of overlapping pixels in duplicating areas of the two fingerprints, for each relative transfer position of the two first character shapes while relatively moving the two first character shapes;
detecting an amount of movement of a transfer position of the two first character shapes having a maximum evaluation value from among the plurality of first evaluation values;
extracting second character shapes from the two first character shapes when there is no significant maximum value from among the plurality of first evaluation values;
calculating, as a second evaluation value, a sum of values obtained by multiplying, with a predetermined weight, the products of two overlapping pixels in duplicating areas of the two fingerprint images and adding the sum to the first evaluation value, for each relative transfer position of the two second character shapes while relatively moving the two second character shapes;
detecting an amount of movement of a transfer position of the two second character shapes having a maximum evaluation value from among the plurality of second evaluation values; and
connecting the two fingerprint images to each other as adjacent fingerprint images, based upon the detected amount of movement of the first and/or second character shapes having the maximum evaluation value to generate a fingerprint image larger than a sensing surface of sensor of the read unit.

2. A method according to claim 1, further comprising extracting binarized shapes as extracted binarized shapes from the two fingerprint images, and the extracting of the second character shapes, extracts edge lines which express contours in the extracted binarized shapes of the two fingerprint images.

3. A method according to claim 1, further comprising:
extracting two third character shapes from the two second character shapes when there is no significant maximum evaluation value from among the plurality of second evaluation values;
calculating, as a third evaluation value, a sum of values obtained by multiplying, with a predetermined weight, the products of two overlapping pixels in duplicating area of the two finger print images and adding the sum to the first evaluation value, for each relative transfer position of the two third character shapes while relatively moving the two third character shapes; and
detecting an amount of movement of a transfer position of the two third character shapes having a maximum evaluation value from among the plurality of third evaluation values;
wherein, binarized shapes are detected from the two fingerprint images, and in the extracting of the two third character shapes, portions in which amounts of changes of tangent directions of edge lines which express contours in the binary shapes of the two fingerprint images are not less than a predetermined value are extracted.

4. A method according to claim 3, further comprising:
extracting two fourth character shapes from the two third character shapes when there is no significant maximum evaluation value from among the plurality of third evaluation values;
calculating, as a fourth evaluation value, a sum of values obtained by multiplying, with a predetermined weight, the products of two overlapping pixels in duplicating areas of the two fingerprint images and adding the sum to the first evaluation value, for each relative transfer position of the two fourth character shapes while relatively moving the two fourth character shapes; and
detecting an amount of movement of a transfer position of the two fourth character shapes having a maximum evaluation value from among the plurality of fourth evaluation values;
wherein, binarized shapes are detected from the two fingerprint images, and in the extracting of the fourth character shapes, end points or branch points of edge lines which express contours in the binary shapes of the two fingerprint images are extracted.

5. A method according to claim 1, wherein, in the detection of the amount of movement of the first and/or second character shapes as searching common areas, after areas of the first and/or second character shapes in the two fingerprint images are extended, a correlative calculation is performed.

6. A method according to claim 1, wherein, in the detection of the amount of movement of the first and/or second character shapes as searching common areas, movement for performing a correlative calculation is limited in a predetermined moving range.

7. A method according to claim 1, wherein, in the detection of the amount of movement of the first and/or second character shapes as searching common areas, only an inside area spaced apart from an end of the two fingerprint images by a predetermined distance or more is subjected to correlative calculation.

8. An image connection method according to claim 1, wherein
in the extracting of the first and/or second character shapes, edge lines which express a binary shapes of the two fingerprint images or contours in the binary shapes are extracted as the first and/or second character shapes of the two fingerprint images, and
in the detection of the amount of movement of the first and/or second character shapes as searching common areas, overlapping connection positions, where changes of tangent directions of lines or edge lines of the binary shapes in the two fingerprint images are smooth and continued, are searched.

9. A method according to claim 1, wherein, the connecting comprises obtaining a ratio of expansion or contraction of the two fingerprint images when a relative speed is generated between a scanning line of a scanner of the read unit and the two finger print images to be connected are corrected based upon calculation from a moving velocity of the finger with respect to the read unit and a scanning speed of the scanner of the read unit.

10. A method according to claim 1, further comprising deciding a start of reading or an end of reading of the fingerprint images according to the detection of the amount of movement of the first and/or second character shapes as searching common areas.

11. A computer-readable recoding medium storing a program to control a computer to execute operations comprising:
continuously inputting fingerprint images by relative movement of a finger in same direction with respect to a read unit sequentially reading biometric portion images of the finger as the fingerprint images;
extracting a first character shapes from two of the input fingerprint images;
calculating, as a first evaluation value, a sum of products of overlapping pixels in duplicating areas of the two fingerprints, for each relative transfer position of the two first character shapes while relatively moving the two first character shapes;
detecting an amount of movement of a transfer, position of the two first character shapes having a maximum evaluation value from among the plurality of first evaluation values;
extracting second character shapes from the two first character shapes when there is no significant maximum evaluation value from among the plurality of first evaluation values;
calculating, as a second evaluation value, a sum of values obtained by multiplying, with a predetermined weight, the products of two overlapping pixels in duplicating areas of the two fingerprint images and adding the sum to the first evaluation value, for relative transfer position of the two second character shapes while relatively moving the two second character shapes;
detecting an amount of movement of a transfer position of the two second character shapes having a maximum evaluation value from among the plurality of second evaluation values; and
connecting the two fingerprint images to each other as adjacent fingerprint images, based upon the detected amount of movement of the first and/or second character shapes having the maximum evaluation value to generate a fingerprint image larger than a sensing surface of a sensor of the read unit.

12. An image connection apparatus, comprising:
a computer readable recording medium; and
a computer controller executing
continuously storing in the computer readable recording medium fingerprint images by relative movement of a finger with respect to a read unit sequentially reading biometric portion images of the finger as the fingerprint images;
a character extraction unit to extract character shapes from fingerprint images;
extracting first character shapes from two of the stored fingerprint images;
calculating, as a first evaluation value, a sum of products of overlapping pixels in duplicating areas as of the two fingerprints, for each relative transfer position of the two first character shapes while relatively moving the two first character shapes;
detecting an amount of movement of a transfer position of the two first character shapes having a maximum evaluation value from among the plurality of first evaluation values;
extracting second character shapes from the two first character shapes when there is no significant maximum evaluation value from among the plurality of first evaluation values;
calculating, as a second evaluation value, a sum of values obtained by multiplying, with a predetermined weight, the products of two overlapping pixels in duplicating areas of the two fingerprint images and adding the sum to the first evaluation value, for each relative transfer position of the two second character shapes while relatively moving the two second character shapes;

detecting an amount of movement of a transfer position of the two second character shapes having a maximum evaluation value from among the plurality of second evaluation values; and connecting the two fingerprint images to each other as adjacent fingerprint images, based upon the detected amount of movement of the first and/or second character shapes having the maximum evaluation value to generate a fingerprint image larger than a sensing surface of a sensor of the read unit.

13. The apparatus according to claim 12, wherein the computer controller further executes extracting binarized shapes as extracted binarized shapes from the two fingerprint images, and the extracting of the second character shapes extracts edge lines which express contours in the extracted binarized shapes of the two fingerprint images.

14. The apparatus according to claim 12, wherein the computer controller further executes:

extracting two third character shapes from the two second character shapes when there is no significant maximum evaluation value from among the plurality of second evaluation values calculating, as a third evaluation value, a sum of values obtained by multiplying, with a predetermined weight, the products of two overlapping pixels in duplicating areas of the two finger print images and adding the sum to the first evaluation value, for each relative transfer position of the two third character shapes while relatively moving the two third character shapes; and detecting an amount of movement of a transfer position of the two third character shapes having a maximum evaluation value from among the plurality of third evaluation values;

wherein, binarized shapes are detected from the two fingerprint images, and in the extracting of the two third character shapes, portions in which amounts of changes of tangent directions of edge lines which express contours in the binary shapes of the two fingerprint images are not less than a predetermined value are extracted.

15. The apparatus according to claim 14, wherein the computer controller further executes:

extracting two fourth character shapes from the two third character shapes when there is no significant maximum evaluation value from among the plurality of third evaluation values;

calculating, as a fourth evaluation value, a sum of values obtained by multiplying, with a predetermined weight, the products of two overlapping pixels in duplicating area of the two fingerprint images and adding the sum to the first evaluation value, for each relative transfer position of the two fourth character shapes while relatively moving the two fourth character shapes; and detecting an amount of movement of a transfer position of the two fourth character shapes having a maximum evaluation value from among the plurality of fourth evaluation value;

wherein, binarized shapes are detected from the two fingerprint images, and in the extracting of the fourth character shapes, end points or branch points of edge lines which express contours in the binary shapes of the two fingerprint images are extracted.

* * * * *

UNITED STATES PATENT AND TRADEMARK OFFICE
CERTIFICATE OF CORRECTION

| | |
|---|---|
| PATENT NO. | : 7,593,553 B2 |
| APPLICATION NO. | : 10/267815 |
| DATED | : September 22, 2009 |
| INVENTOR(S) | : Fujii |

Page 1 of 1

It is certified that error appears in the above-identified patent and that said Letters Patent is hereby corrected as shown below:

Column 28, Line 14, change "transfer," to --transfer--.

Column 29, Line 26, change "values" to --values;--.

Signed and Sealed this

Nineteenth Day of January, 2010

David J. Kappos
*Director of the United States Patent and Trademark Office*